(12) United States Patent
Sasada et al.

(10) Patent No.: US 12,097,714 B2
(45) Date of Patent: Sep. 24, 2024

(54) INK JET RECORDING METHOD

(71) Applicant: FUJIFILM CORPORATION, Tokyo (JP)

(72) Inventors: Misato Sasada, Kanagawa (JP); Toshiyuki Makuta, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 643 days.

(21) Appl. No.: 17/204,951

(22) Filed: Mar. 18, 2021

(65) Prior Publication Data

US 2021/0206175 A1 Jul. 8, 2021

Related U.S. Application Data

(63) Continuation of application No. PCT/JP2019/032848, filed on Aug. 22, 2019.

(30) Foreign Application Priority Data

Sep. 28, 2018 (JP) .................. 2018-185540

(51) Int. Cl.
*B41J 2/21* (2006.01)
*B41M 5/44* (2006.01)
(Continued)

(52) U.S. Cl.
CPC .............. *B41J 2/2128* (2013.01); *B41M 5/44* (2013.01); *C09D 11/101* (2013.01); (Continued)

(58) Field of Classification Search
CPC .................................. B41J 11/00214
See application file for complete search history.

(56) References Cited

U.S. PATENT DOCUMENTS

| 2004/0003755 A1 | 1/2004 | Fukumoto et al. |
| 2007/0082963 A1 | 4/2007 | Bhatt |
| | (Continued) | |

FOREIGN PATENT DOCUMENTS

| CN | 1456606 A | 11/2003 |
| CN | 102341461 A | 2/2012 |
| | (Continued) | |

OTHER PUBLICATIONS

Machine generated English translation of "Inkjet printer and Inkjet printing method"; translation retreived via FIT database on Aug. 8, 2023; 26pp.*

(Continued)

*Primary Examiner* — Shelby L Fidler
(74) *Attorney, Agent, or Firm* — SOLARIS Intellectual Property Group, PLLC

(57) ABSTRACT

Provided is an ink jet recording method including recording an infrared absorbing image by applying a first ink, which contains an infrared absorber and a first curable compound, onto an impermeable substrate by an ink jet method, semi-curing the infrared absorbing image by irradiating the infrared absorbing image with active energy rays, recording a non-infrared absorbing image by applying a second ink, which has a content of the infrared absorber of lower than 0.1% by mass and contains a second curable compound, to a surface of the substrate with the infrared absorbing image by the ink jet method, and curing the semi-cured infrared absorbing image and the non-infrared absorbing image by irradiating these images with active energy rays.

9 Claims, 3 Drawing Sheets

(51) Int. Cl.
*C09D 11/101* (2014.01)
*C09D 11/107* (2014.01)
*B41M 3/14* (2006.01)

(52) U.S. Cl.
CPC ............. *C09D 11/107* (2013.01); *B41M 3/14* (2013.01); *B41M 2205/38* (2013.01)

(56) References Cited

U.S. PATENT DOCUMENTS

| | | | |
|---|---|---|---|
| 2007/0296790 | A1 | 12/2007 | Nakazawa et al. |
| 2011/0070407 | A1 | 3/2011 | Kato et al. |
| 2011/0310204 | A1* | 12/2011 | Ohnishi ............... B41M 7/0081 347/102 |
| 2013/0113868 | A1* | 5/2013 | Veis .................... C09D 11/101 347/102 |
| 2013/0286095 | A1 | 10/2013 | Wada et al. |
| 2014/0062076 | A1* | 3/2014 | Makuta ............. B41J 11/00212 283/114 |
| 2015/0191031 | A1* | 7/2015 | Ohta .................... B41M 7/0036 428/207 |
| 2016/0075148 | A1 | 3/2016 | Nakano |
| 2016/0090504 | A1* | 3/2016 | Araki .................. C09D 167/00 522/64 |
| 2017/0029636 | A1 | 2/2017 | Oki et al. |
| 2022/0348034 | A1* | 11/2022 | Terada .................. C09D 11/50 |

FOREIGN PATENT DOCUMENTS

| | | | |
|---|---|---|---|
| CN | 105462307 | A | 4/2016 |
| EP | 2404970 | A1 | 1/2012 |
| JP | 2007-291239 | A | 11/2007 |
| JP | 2008-207335 | A | 9/2008 |
| JP | 2009-511661 | A | 3/2009 |
| JP | 2009-249562 | A | 10/2009 |
| JP | 2010-132780 | A | 6/2010 |
| JP | 2013-230599 | A | 11/2013 |
| JP | 2016-060049 | A | 4/2016 |
| JP | 2016-069654 | A | 5/2016 |
| JP | 2018069707 | A * | 5/2018 ............ B41J 11/002 |
| WO | 2015/068282 | A1 | 5/2015 |
| WO | 2016/158209 | A1 | 10/2016 |
| WO | WO-2017056760 | A1 * | 4/2017 |

OTHER PUBLICATIONS

English language translation of the following: Office action dated Nov. 2, 2021, from the JPO in a Japanese patent application No. 2020-548174 corresponding to the instant patent application.
English language translation of the following: Office action dated Dec. 27, 2021 from the SIPO in a Chinese patent application No. 201980062238.8 corresponding to the instant patent application. This office action translation is submitted now in order to supplement the understanding of the cited references which are being disclosed in the instant Information Disclosure Statement.
International Search Report issued in International Application No. PCT/JP2019/032848 on Nov. 5, 2019.
Written Opinion of the ISA issued in International Application No. PCT/JP2019/032848 on Nov. 5, 2019.

* cited by examiner

INK JET RECORDING METHOD

CROSS-REFERENCE TO RELATED APPLICATIONS

This application is a continuation application of International Application No. PCT/JP2019/032848, filed Aug. 22, 2019, the disclosure of which is incorporated herein by reference in its entirety. Further, this application claims priority from Japanese Patent Application No. 2018-185540, filed Sep. 28, 2018, the disclosure of which is incorporated herein by reference in its entirety.

BACKGROUND OF THE INVENTION

1. Field of the Invention

The present disclosure relates to an ink jet recording method.

2. Description of the Related Art

Generally, as means of optically reading the information written on certificates such as stock certificates, bond certificates, checks, gift certificates, lottery tickets, and commuter's tickets, barcodes or code patterns that can be read with an optical character reader (OCR) are often provided. Furthermore, as code patterns using optical reading, barcodes are widely used mainly in the logistics management system and the like. In addition, in recent years, two-dimensional codes such as data codes, Vericode, Codeone, Maxicode, and two-dimensional bar codes (QR code (registered trademark)) have been widespread which have a higher data capacity and can be printed at a high density. Moreover, a method using a dot pattern is also known.

Generally, the above code patterns are visible code patterns which impose various restrictions on printed materials such as a restriction on the design of the printed materials and a necessity of securing a print area. Therefore, there is an increasing demand for eliminating these restrictions. Furthermore, for the purpose of preventing forgery of certificates, an attempt has been made to make the code patterns transparent by recording the code patterns with an ink having no absorption band in the visible light region. Making the code patterns transparent brings advantages such as being able to freely design records, no need to secure an area for recording the code patterns, and making it difficult to visually identify or recognize the code patterns.

As one of the attempts to make the code patterns transparent (invisible), a technique is known in which an infrared absorbing image is formed using an ink that mainly absorbs infrared rays outside the visible light region.

As the above technique, for example, JP2008-207335A describes a printed material with a latent image including a substrate and two latent image patterns composed of a plurality of pixels of the same color that is regularly arranged on the substrate, in which the printed material has a first latent image pattern formed of a first area in which the plurality of pixels is arranged in different phases in a first direction and a second latent image pattern formed of a second area in which the plurality of pixels is printed with a functional ink.

SUMMARY OF THE INVENTION

Various information (for example, QR code (registered trademark)) can be recorded by recording an infrared absorbing image with an ink containing an infrared absorber and a curable compound that is cured by the application of active energy rays. Because this infrared absorbing image contains various information, it is important to protect the information from code forgery.

Making the infrared absorbing image undetectable (for example, making it difficult to visually or tactually recognize the infrared absorbing image, and the like) is considered important for protecting the information.

However, especially in a case where an attempt is made to record an infrared absorbing image on an impermeable substrate, an ink cannot permeate the substrate, and the thickness of the infrared absorbing image increases. As a result, irregular patterns tend to be easily formed in the image recording area, and the image tends to be easily detected.

The printed material with a latent image described in JP2008-207335A is obtained by recording a latent image on commercially available paper. Presumably, in a case where an attempt is made to record the same image on an impermeable substrate instead of the commercially available paper, the image area may be an irregular pattern, and the thickness of the latent image may be detectable.

An object to be achieved by an embodiment of the present disclosure is to provide an ink jet recording method which makes it possible to record a highly undetectable infrared absorbing image.

Means for achieving the above object includes the following aspects.

<1> An ink jet recording method comprising recording an infrared absorbing image by applying a first ink, which contains an infrared absorber and a first curable compound to be cured by application of active energy rays, onto an impermeable substrate by an ink jet method, semi-curing the infrared absorbing image by irradiating the infrared absorbing image with active energy rays, recording a non-infrared absorbing image by applying a second ink, which has a content of the infrared absorber of lower than 0.1% by mass and contains a second curable compound, to a surface of the substrate with the semi-cured infrared absorbing image by the ink jet method, and curing the semi-cured infrared absorbing image and the non-infrared absorbing image by irradiating these images with active energy rays, in which the first curable compound and the second curable compound contain a urethane (meth)acrylate-based oligomer, and in which an absolute value of a difference between a refractive index of the first curable compound and a refractive index of the second curable compound is equal to or lower than 0.07.

<2> The ink jet recording method described in <1>, in which the recording of a non-infrared absorbing image is applying the second ink to an area of the substrate that includes at least a part of an area in which the infrared absorbing image is recorded and an area other than the area in which the infrared absorbing image is recorded.

<3> The ink jet recording method described in <1>, in which the recording of a non-infrared absorbing image is applying the second ink to an area of the substrate that includes the entirety of an area in which the infrared absorbing image is recorded.

<4> The ink jet recording method described in any one of <1> to <3>, in which a content of an organic solvent in the first ink is lower than 1% by mass with respect to a total mass of the first ink.

<5> The ink jet recording method described in any one of <1> to <4>, further comprising performing, before the recording of an infrared absorbing image, forming an undercoat layer by applying an undercoat composition, which contains an isocyanate group-containing compound, a radically polymerizable monomer, and a radical polymerization initiator, onto the impermeable substrate, in which the curing is irradiating the infrared absorbing image, the non-infrared absorbing image, and the undercoat layer with active energy rays.

<6> The ink jet recording method described in <5>, further comprising performing, between the forming of an undercoat layer and the recording of an infrared absorbing image, semi-curing the undercoat composition, which is applied in the forming of an undercoat layer, by irradiating the undercoat composition with active energy rays.

<7> The ink jet recording method described in any one of <1> to <6>, in which a compound taking up 50% by mass or more of a total mass of the first curable compound and a compound taking up 50% by mass or more of a total mass of the second curable compound are the same compound.

<8> The ink jet recording method described in any one of <1> to <7>, in which a compound taking up 70% by mass or more of a total mass of the first curable compound and a compound taking up 70% by mass or more of a total mass of the second curable compound are the same compound.

<9> The ink jet recording method described in any one of <1> to <8>, in which an absolute value of a difference between surface tension of the first ink and surface tension of the second ink is 0 mN/m to 3 mN/m.

According to the embodiment of the present disclosure, an ink jet recording method which makes it possible to record a highly undetectable infrared absorbing image can be provided.

DESCRIPTION OF THE PREFERRED EMBODIMENTS

Figure 1:
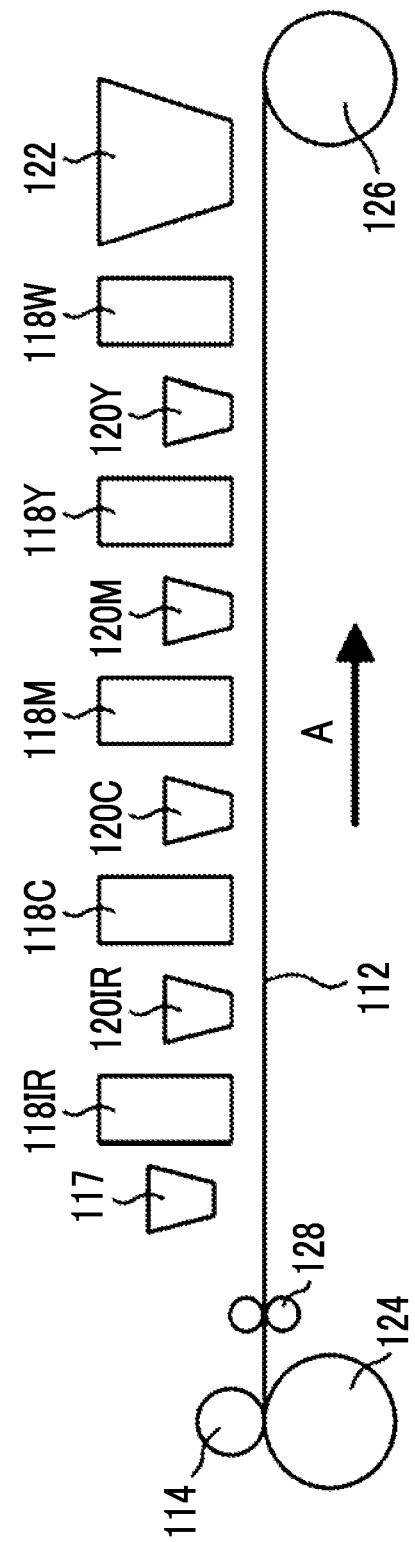
FIG. 1 is a schematic view showing an example of an ink jet recording device suitably used in the present disclosure.

The details of the present disclosure will be described below.

The following constituents will be described based on the typical embodiments of the present disclosure in some cases, but the present invention is not limited to the embodiments.

In the present disclosure, a range described using "to" includes the numerical values listed before and after "to" as a lower limit and upper limit. Regarding the ranges of numerical values described in stages in the present disclosure, the upper or lower limit of a range of numerical values may be replaced with the upper or lower limit of another range of numerical values described in stages. Furthermore, regarding the ranges of numerical values described in the present disclosure, the upper or lower limit of a range of numerical values may be replaced with values described in examples.

Regarding the groups (atomic groups) described in the present disclosure, in a case where a group is simply mentioned without being described in terms of whether it is substituted or unsubstituted, such a group includes both the group having no substituent and group having a substituent. For example, "alkyl group" includes not only an alkyl group having no substituent (unsubstituted alkyl group) but also an alkyl group having a substituent (substituted alkyl group).

In addition, some of the chemical structural formulas in the present specification may be described as a simplified structural formula from which a hydrogen atom is omitted.

In the present disclosure, in a case where there is a plurality of substances in a composition that corresponds to each component of the composition, unless otherwise specified, the amount of each component of the composition means the total amount of the plurality of substances present in the composition.

In the present disclosure, "(meth)acrylate" represents acrylate and methacrylate, "(meth)acryl" represents acryl and methacryl, and "(meth)acryloyl" represents acryloyl and methacryloyl.

Furthermore, in the present disclosure, the combination of preferred aspects is a more preferred aspect.

In the present disclosure, the term "step" includes not only an independent step, but also a step that is not clearly distinguished from other steps as long as the step achieves the intended goal.

In addition, in the present disclosure, the combination of two or more preferred aspects is a more preferred aspect.

<<Ink Jet Recording Method>>

An ink jet recording method of the present disclosure includes a step of recording an infrared absorbing image by applying a first ink, which contains an infrared absorber and a first curable compound to be cured by application of active energy rays, onto an impermeable substrate by an ink jet method, a step of semi-curing the infrared absorbing image by irradiating the infrared absorbing image with active energy rays, a step of recording a non-infrared absorbing image by applying a second ink, which has a content of the infrared absorber of lower than 0.1% by mass and contains a second curable compound, to a surface of the substrate with the semi-cured infrared absorbing image by the ink jet method, and a step of curing the semi-cured infrared absorbing image and the non-infrared absorbing image by irradiating these images with active energy rays, in which an absolute value of a difference between a refractive index of the first curable compound and a refractive index of the second curable compound is equal to or lower than 0.07.

In the ink jet recording method of the present disclosure, a non-infrared absorbing image is recorded on the substrate, which has the infrared absorbing image recorded using the first ink, by applying the second ink to the substrate, and the applied first ink is caused to be in a semi-cured state before the application of the second ink. Therefore, the substrate surface on which the infrared absorbing image and the non-infrared absorbing image are recorded is easily flattened. Furthermore, in the ink jet recording method of the present disclosure, the absolute value of a difference between a refractive index of the first curable compound and a refractive index of the second curable compound is equal to or lower than 0.07. Therefore, it is possible to make it difficult to visually recognize the boundary between the infrared absorbing image and the non-infrared absorbing image. As a result, it is possible to suppress the occurrence of irregularities on the substrate surface by the infrared absorbing image, and to improve the undetectability of the infrared absorbing image.

An impermeable substrate does not allow an ink to easily permeate into the substrate. Accordingly, due to an infrared absorbing image recorded, irregularities easily occur on the substrate surface. Therefore, in a case where an infrared absorbing image is recorded on the impermeable substrate, for example, with the technique in JP2008-207335A, it is difficult to make the infrared absorbing image undetectable. Furthermore, presumably, for example, even though the infrared absorbing image which can be tactually recognized by touching the substrate surface cannot be visually recognized, in a case where the outline portion of the infrared absorbing image can be visually recognized, the image may be easily detected. On the other hand, with the ink jet recording method of the present disclosure, even though an impermeable substrate is used, it is possible to inhibit the occurrence of irregularities, make it difficult to visually detect the infrared absorbing image, and improve the undetectability of the image.

As described above, the ink jet recording method of the present disclosure makes it difficult to recognize the infrared absorbing image even though the image is watched or touched, for example. As a result, the ink jet recording method can improve the undetectability of the infrared absorbing image.

<First Ink Application Step>

The ink jet recording method of the present disclosure has a first ink application step of applying a first ink, which contains an infrared absorber and a first curable compound cured by the application of active energy rays, onto an impermeable substrate by an ink jet method so as to record an infrared absorbing image.

In the present step, the ink can be selectively applied onto the impermeable substrate, and a desired infrared absorbing pattern can be formed.

The infrared absorbing pattern formed in the present step is not particularly limited, but is preferably an infrared absorbing pattern consisting of a plurality of element patterns (for example, a dot pattern, a line pattern, and the like), in other words, an infrared absorbing pattern which is a group of a plurality of element patterns.

In the present step, in a case where the infrared absorbing pattern consisting of a plurality of element patterns is formed, the effect brought about by a solvent (infrared ray (IR) readability improving effect resulting from the improvement of uniformity of pattern shape, pattern accuracy, and pattern density) is particularly effectively demonstrated.

The diameter of each dot in the dot pattern is preferably 25 µm to 70 µm, and more preferably 30 µm to 60 µm.

The ink jet method is not particularly limited, and any of known methods may be used. Examples thereof include an electric charge control method of jetting an ink by using electrostatic attraction force, a drop-on-demand method using the vibration pressure of a piezo element (pressure pulse method), an acoustic ink jet method of jetting an ink by using radiation pressure by means of converting electric signals into acoustic beams and irradiating the ink with the acoustic beams, a thermal ink jet (Bubble Jet (registered trademark)) method of forming bubbles by heating an ink and using the generated pressure, and the like.

As the ink jet method, particularly, it is possible to effectively use the method described in JP1979-059936A (JP-S54-059936A), which is an ink jet method of causing an ink to experience a rapid volume change by the action of heat energy and jetting the ink from a nozzle by using the acting force resulting from the change of state.

Furthermore, regarding the ink jet method, the method described in paragraphs "0093" to "0105" of JP2003-306623A can also be referred to.

Examples of ink jet heads used in the ink jet method include ink jet heads for a shuttle method of using short serial heads that are caused to scan a substrate in a width direction of the substrate so as to perform recording and ink jet heads for single-pass method of using line heads that each consist of recording elements arranged for the entire area of each side of a substrate.

In the single-pass method, by causing the substrate to be scanned in a direction orthogonal to the arrangement direction of the recording elements, a pattern can be formed on the entire surface of the substrate. Therefore, this method does not require a transport system such as a carriage that moves short heads for scanning.

Furthermore, in the single-pass method, complicated scanning control for moving a carriage and a substrate is not necessary, and only a substrate moves. Therefore, the recording speed can be further increased in the single-pass method than in the shuttle method.

Although the pattern forming method of the present embodiment is applicable to both the methods, it is preferable to apply the pattern forming method to the single-pass method.

From the viewpoint of obtaining a high-definition pattern, the amount of droplets of the first ink jetted from the ink jet head is preferably 1 pL (picoliter) to 50 pL, and more preferably 1.5 pL to 12 pL.

In the present disclosure, known ink jet recording devices can be used without particular limitation.

The active energy ray irradiation can be performed in an ink jet recording device. Specifically, the active energy ray irradiation is performed, for example, by a shuttle method in which short serial heads provided with an active energy ray irradiation device are caused to scan a recording medium in a width direction of the medium so that the medium is irradiated, a single-pass method of using active energy ray irradiation devices arranged for the entire area of each side of a recording medium, and the like.

Among these, from the viewpoint of undetectability of the infrared absorbing image, the ink jet recording device for the single-pass method is preferable.

Examples of the ink jet recording device for the single-pass method include the ink jet recording device described in JP6246686B. Examples of the ink jet recording device for the shuttle method include the ink jet recording device described in JP5654535B.

[First Ink]

The first ink in the present disclosure contains an infrared absorber and a first curable compound that is cured by the application of active energy rays. The first ink of the present disclosure preferably contains a radical initiator. If necessary, the first ink may further contain other components such as a polymerization inhibitor and a surfactant.

(Infrared Absorber)

The first ink contains an infrared absorber.

In the present specification, in a case where a substance is prepared as a solution or a mixed solution having a concentration of 0.01% by mass, and the solution or mixed solution has a maximum absorbance equal to or higher than 0.3 at a wavelength of 650 nm to 1,100 nm, this substance is called "infrared absorber".

In a case where the infrared absorber is used by being dissolved, as solvents used for preparing the solution or mixed solution described above, it is possible to use a solvent having excellent dissolvability, the main solvent in the ink, or a monomer. In a case where the infrared absorber is used by being dispersed, it is possible to use a solvent that does not deteriorate the dispersibility (for example, tripropylene glycol methyl ether).

From the viewpoint of IR readability of the pattern, the maximum absorbance of the aforementioned solution (solution having an infrared absorber concentration of 0.01% by mass) at a wavelength of 650 nm to 1,100 nm is preferably equal to or higher than 0.4.

From the viewpoint of further improving the invisibility of the pattern, the absorbance of the aforementioned solution (solution having an infrared absorber concentration of 0.01% by mass) in a wavelength range of 400 nm to 650 nm is preferably equal to or lower than 0.3, more preferably equal to or lower than 0.2, and particularly preferably equal to or lower than 0.1.

As the infrared absorber, known substances can be used. Examples thereof include colorants such as pigments and dyes.

As dyes used as the infrared absorber, it is possible to use commercially available dyes, known dyes described in documents such as "Dye Handbook" (edited by The Society of Synthetic Organic Chemistry, Japan, published in 1970), the compounds described in WO2016/186050A and JP5202915B, and the like. Specifically, examples thereof include an azo dye, a metal complex salt azo dye, a pyrazolone azo dye, a naphthoquinone dye, an anthraquinone dye, a phthalocyanine dye, a carbonium dye, a quinoneimine dye, a pyrrolopyrrole compound, a naphthalocyanine compound, a diimmonium compound, a dithiol compound, an azomethine compound, a cyanine colorant, a squarylium colorant, a polymethine colorant such as an oxonol colorant, a pyrylium salt, a metal thiolate complex, cesium tungsten oxide, and the like.

It is preferable that the first ink contain, as the infrared absorber, at least one kind of infrared absorber among an infrared absorber having a cyanine skeleton, a squarylium colorant, and an infrared absorber having a phthalocyanine skeleton among the above.

In the present specification, "cyanine skeleton" means a skeleton containing two nitrogen-containing heterocycles and a plurality of methine groups arranged between the two nitrogen-containing heterocycles.

Specific examples of the infrared absorber are as below (example compounds (IR-1) to (IR-24)). Here, the infrared absorber is not limited to the following specific examples.

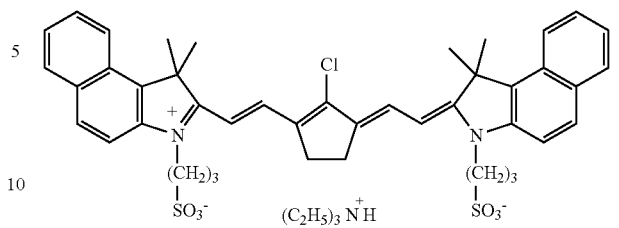
(IR-2)

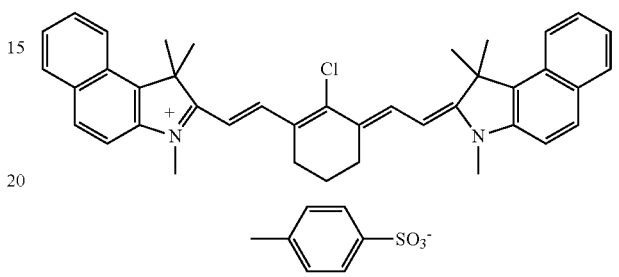
(IR-3)

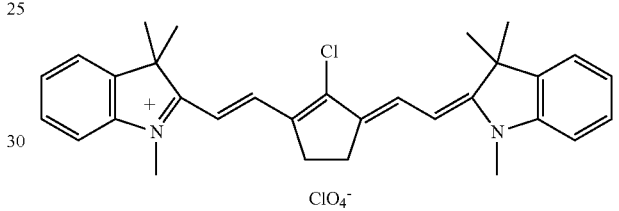
(IR-4)

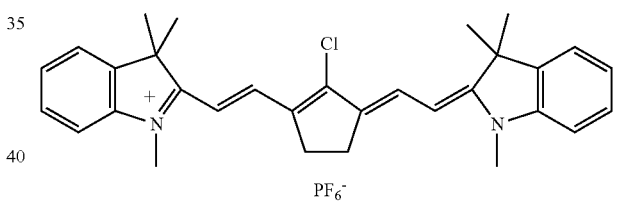
(IR-5)

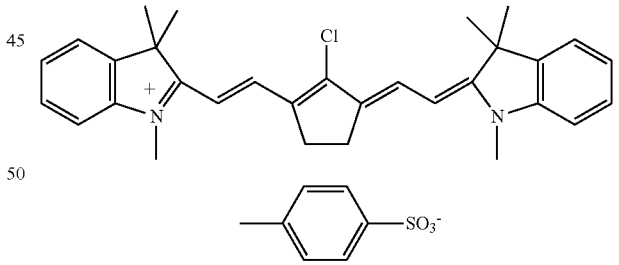
(IR-6)

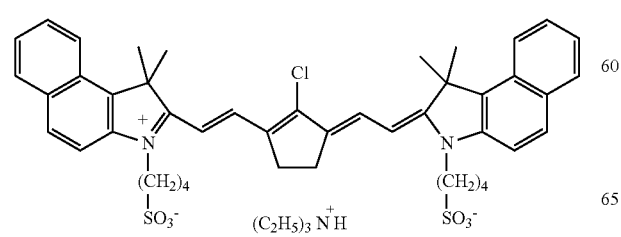
(IR-1)

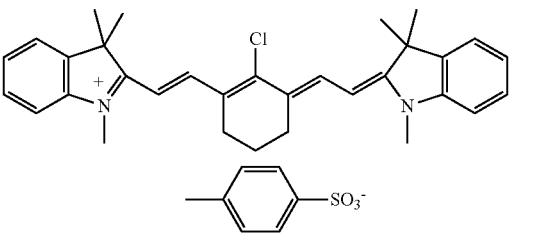
(IR-7)

-continued
(IR-8)
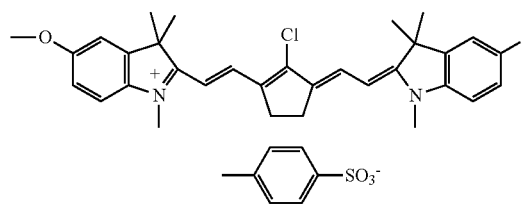
(IR-9)
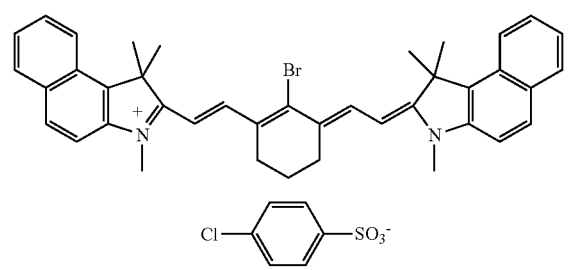
(IR-10)
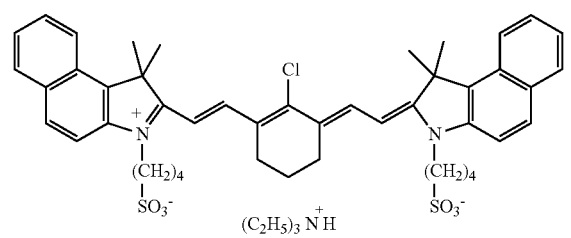
(IR-11)
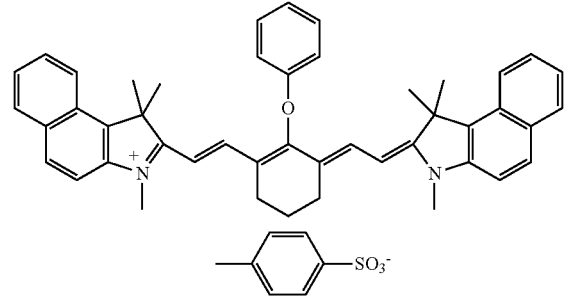
(IR-12)
(IR-13)
-continued
(IR-14)
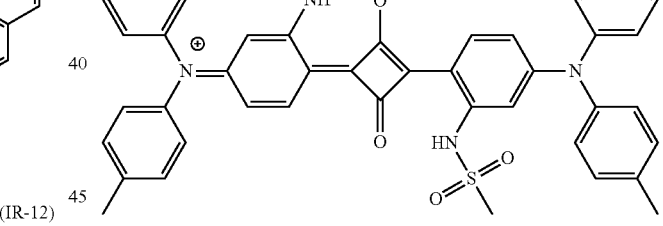
(IR-15)
(IR-16)
(IR-17)

-continued (IR-18)

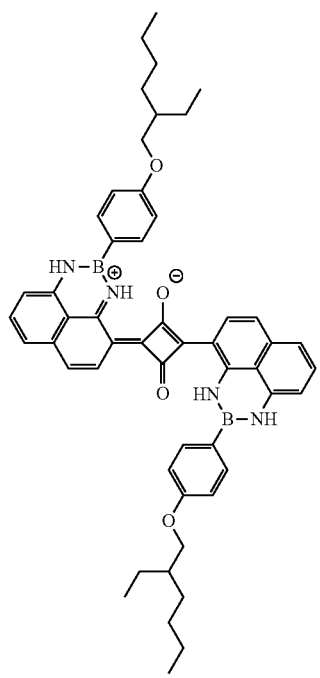

(IR-19)

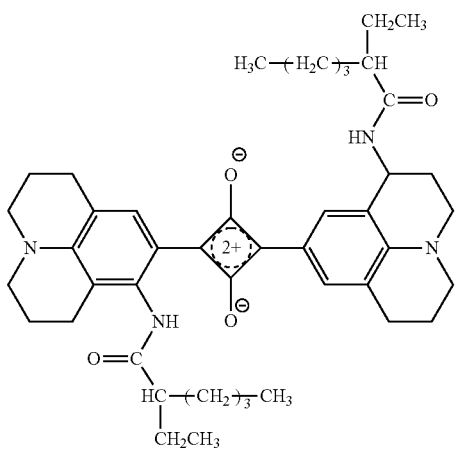

(IR-20)

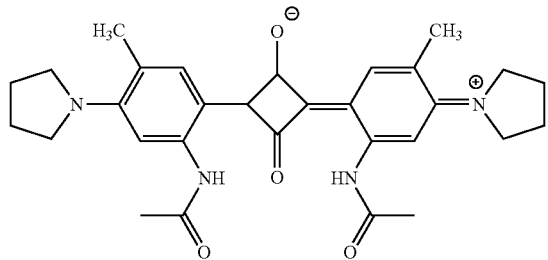

(IR-21)

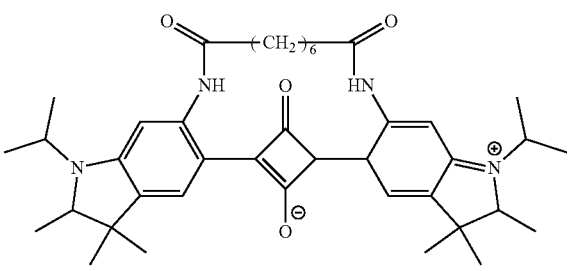

(IR-22)

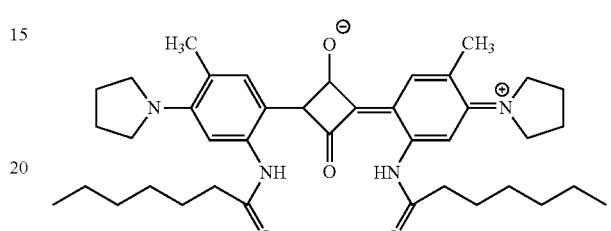

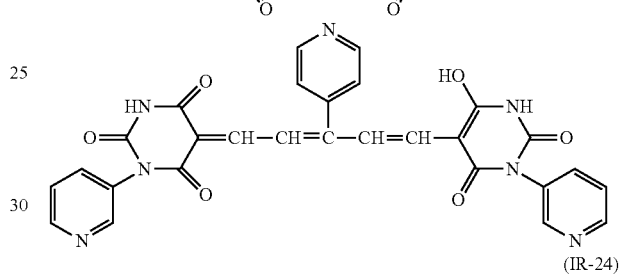

(IR-24)

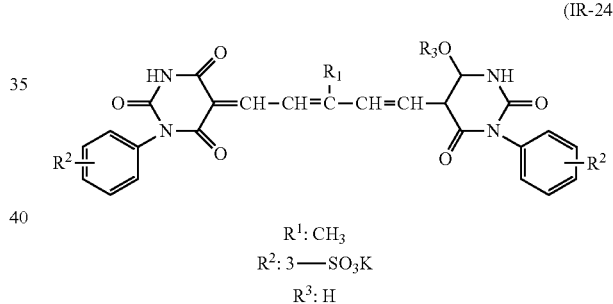

$R^1$: $CH_3$
$R^2$: 3—$SO_3K$
$R^3$: H

The infrared absorber can be synthesized with reference to the conventionally known synthesis methods. Furthermore, as the infrared absorber, commercially available products may also be used.

The content of the infrared absorber in the first ink is preferably 0.1% to 10% by mass with respect to the total mass of the first ink.

In a case where the content of the infrared absorber is equal to or higher than 0.1% by mass, the IR readability of the pattern is further improved.

In a case where the content of the infrared absorber is equal to or lower than 10% by mass, this is advantageous for improving the invisibility of the pattern and reducing the manufacturing cost of the ink.

The content of the infrared absorber in the first ink is more preferably 0.3% to 5% by mass.

(First Curable Compound)

The first ink contains a first curable compound that is cured by the application of active energy rays.

The active energy rays refer to energy rays capable of generating an initiating species in the first ink by the irradiation with the energy rays, and include a wide variety of energy rays such as α rays, γ rays, X rays, ultraviolet rays, visible rays, and electron beams.

The first curable compound is not particularly limited as long as it is cured by the application of active energy rays, and examples thereof include a radically polymerizable monomer, a radically polymerizable oligomer, and a cationically polymerizable monomer. Among these, a radically polymerizable monomer is preferable.

The first curable compound may be a solid or a liquid.

—Radically Polymerizable Monomer—

As the radically polymerizable monomer, an ethylenically unsaturated compound is preferable. Known ethylenic compounds can be used, and examples thereof include a (meth)acrylate compound, a vinyl ether compound, an allyl compound, a N-vinyl compound, unsaturated carboxylic acids, and the like. Examples thereof include the radically polymerizable monomers described in JP2009-221414A, the polymerizable compounds described in JP2009-209289A, and the ethylenically unsaturated compounds described in JP2009-191183A.

The ethylenically unsaturated compound is preferably a (meth)acrylate compound, and more preferably an acrylate compound.

The content of a polyfunctional ethylenically unsaturated compound in the first ink is preferably equal to or higher than 70% by mass with respect to the total content of the radically polymerizable monomer. In a case where the content of the polyfunctional ethylenically unsaturated compound is within the above range, the occurrence of odor can be inhibited.

Furthermore, from the viewpoint of curing properties and adhesiveness, it is preferable that the first ink contain the polyfunctional ethylenically unsaturated compound.

In the present disclosure, the first ink preferably contains, as the polyfunctional ethylenically unsaturated compound, a polyfunctional (meth)acrylate compound, more preferably contains a difunctional (meth)acrylate compound, and even more preferably contains a difunctional acrylate compound. It is particularly preferable that the first ink contain a diacrylate monomer because this compound has low viscosity and excellent reactivity.

In the present disclosure, a monomer means a radically polymerizable compound having a viscosity lower than 0.1 Pa·s at room temperature (25° C.). The molecular weight of the monomer (weight-average molecular weight in a case where the monomer has molecular weight distribution) is preferably lower than 1,000.

As the polyfunctional ethylenically unsaturated compound, for example, a di(meth)acrylic acid ester (difunctional (meth)acrylate compound) of an aliphatic hydrocarbon diol having 6 to 12 carbon atoms is preferable. The hydrocarbon diol may be any of a linear hydrocarbon diol, a branched hydrocarbon diol, and a cyclic hydrocarbon diol. Among these, for example, a linear hydrocarbon diol and a branched hydrocarbon diol are preferable.

The di(meth)acrylic acid ester of the aliphatic hydrocarbon diol having 6 to 12 carbon atoms is preferable because this compound has low viscosity and is relatively less odorous.

As the di(meth)acrylic acid ester of the aliphatic hydrocarbon diol having 6 to 12 carbon atoms, for example, 1,6-hexanediol di(meth)acrylate, 1,7-heptanediol di(meth)acrylate, 1,8-octanediol di(meth)acrylate, 1,9-nonanediol di(meth)acrylate, 1,10-decanediol di(meth)acrylate, 1,12-dodecanediol di(meth)acrylate, 3-methyl-1,5-pentanediol di(meth)acrylate, 2-n-butyl-2-ethyl-1,3-propanediol di(meth)acrylate, cyclohexanedimethanol di(meth)acrylate, and tricyclodecanedimethanol di(meth)acrylate are preferable.

Among these, decanediol diacrylate, dodecanediol diacrylate, and 3-methyl-1,5-pentanediol dimethacrylate are more preferable, and 3-methyl-1,5-pentanediol diacrylate is even more preferable.

In the present disclosure, a (meth)acrylate monomer means a compound that contains one or more (meth)acryloyloxy groups in a molecule and has a viscosity lower than 0.1 Pa·s at room temperature (25° C.).

Specifically, as other difunctional (meth)acrylate compounds, for example, dipropylene glycol di(meth)acrylate, tetraethylene glycol di(meth)acrylate, neopentyl glycol di(meth)acrylate, ethylene oxide (EO)-modified neopentyl glycol di(meth)acrylate, propylene oxide (PO)-modified neopentyl glycol di(meth)acrylate, EO-modified hexanediol di(meth)acrylate, PO-modified hexanediol di(meth)acrylate, tripropylene glycol di(meth)acrylate, and triethylene glycol di(meth)acrylate are preferable.

Examples of functional (meth)acrylate compounds having three or more functional groups include pentaerythritol tri(meth)acrylate, pentaerythritol tetra(meth)acrylate, dipentaerythritol tetra(meth)acrylate, trimethylolethane tri(meth)acrylate, trimethylolpropane tri(meth)acrylate, tetramethylolmethane tetra(meth)acrylate, and oligoester (meth)acrylate.

The first ink may contain a monofunctional ethylenically unsaturated compound as a radically polymerizable monomer. Examples of the monofunctional ethylenically unsaturated compound include a monofunctional (meth)acrylate compound, a monofunctional (meth)acrylamide compound, a monofunctional aromatic vinyl compound, a monofunctional vinyl ether compound (such as triethylene glycol divinyl ether), a monofunctional N-vinyl compound (such as N-vinylcaprolactam), and the like.

Examples of the monofunctional (meth)acrylate compound include hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, benzyl (meth)acrylate, 2-ethylhexyl diglycol (meth)acrylate, butoxyethyl (meth)acrylate, 2-chloroethyl (meth)acrylate, 4-bromobutyl (meth)acrylate, cyanoethyl (meth)acrylate, butoxymethyl (meth)acrylate, 3-methoxybutyl (meth)acrylate, 2-(2-methoxyethoxy)ethyl (meth)acrylate, 2-(2-butoxyethoxy)ethyl (meth)acrylate, 2,2,2-tetrafluoroethyl (meth)acrylate, 1H, 1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, 3-hydroxybutyl (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, oligoethylene oxide monomethyl ether (meth)acrylate, polyethylene oxide (meth)acrylate, oligoethylene oxide (meth)acrylate, oligoethylene oxide monoalkyl ether (meth)acrylate, polyethylene oxide monoalkyl ether (meth)acrylate, dipropylene glycol (meth)acrylate, polypropylene oxide monoalkyl ether (meth)acrylate, oligopropylene oxide monoalkyl ether (meth)acrylate, 2-methacryloyloxyethyl succinate, 2-methacryloyloxyhexahydrophthalic acid, 2-methacryloyloxyethyl-2-hydroxypropyl phthalate, butoxydiethylene glycol (meth)acrylate, trifluoroethyl (meth)acrylate, perfluorooctylethyl (meth)acrylate, 2-hydroxy-3-phenoxypropyl (meth) acrylate, ethylene oxide (EO)-modified phenol (meth)acrylate, EO-modified cresol (meth)acrylate, EO-modified nonylphenol (meth)acrylate, propylene oxide (PO)-modified nonylphenol (meth)acrylate, EO-modified-2-ethylhexyl (meth)acrylate, dicyclopentenyl (meth)acrylate, dicyclopentenyloxyethyl (meth)acrylate, dicyclopentanyl (meth)acrylate, (3-ethyl-3-oxetanylmethyl) (meth)acrylate, and phenoxyethylene glycol (meth)acrylate.

Examples of the (meth)acrylamide compound include (meth)acrylamide, N-methyl (meth)acrylamide, N-ethyl (meth)acrylamide, N-propyl (meth)acrylamide, N-n-butyl (meth)acrylamide, and N-t-butyl (meth)acrylamide, N-butoxymethyl (meth)acrylamide, N-isopropyl (meth)acrylamide, N-methylol (meth)acrylamide, N,N-dimethyl (meth) acrylamide, N,N-diethyl (meth)acrylamide, and (meth) acryloylmorpholine.

Examples of the aromatic vinyl compound include styrene, dimethylstyrene, trimethylstyrene, isopropylstyrene, chloromethylstyrene, methoxystyrene, acetoxystyrene, chlorostyrene, dichlorostyrene, bromostyrene, vinyl benzoic acid methyl ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allyl styrene, isopropenyl styrene, butenyl styrene, octenyl styrene, 4-t-butoxycarbonyl styrene, 4-t-butoxystyrene, and the like.

—Oligomer—

It is preferable that the first curable compound in the present disclosure contain an oligomer.

The "oligomer" is a polymer having a structural unit based generally on a finite number (generally 5 to 100) of monomers. The weight-average molecular weight of the oligomer is preferably 1,000 to 10,000.

As the oligomer, an oligomer having a polymerizable group as a functional group is preferable, an oligomer having an ethylenically unsaturated group as a functional group is more preferable, and an oligomer having a (meth) acryloyl group as a functional group is particularly preferable.

From the viewpoint of the balance between flexibility and curing properties, the number of functional groups contained in one molecule of the oligomer is preferably 1 to 15, more preferably 2 to 6, even more preferably 2 to 4, and particularly preferably 2.

Examples of the oligomer in the present disclosure include a urethane (meth)acrylate-based oligomer, a polyester (meth)acrylate-based oligomer, an olefin-based oligomer (such as an ethylene oligomer, a propylene oligomer, or a butene oligomer), a vinyl-based oligomer (such as a styrene oligomer, a vinyl alcohol oligomer, a vinyl pyrrolidone oligomer, or a (meth)acrylate oligomer), a diene-based oligomer (such as a butadiene oligomer, chloroprene rubber, or a pentadiene oligomer), an oligomer for ring-opening polymerization (such as di-, tri-, or tetraethylene glycol, polyethylene glycol, or polyethylimine), an oligomer for polyaddition (oligoester (meth)acrylate, a polyamide oligomer, or a polyisocyanate oligomer), an oligomer for addition condensation (such as a phenolic resin, an amino resin, a xylene resin, or a ketone resin), an amine-modified polyester-based oligomer, and the like. Among these, a urethane (meth)acrylate-based oligomer and a polyester (meth)acrylate-based oligomer are more preferable, and a urethane (meth)acrylate-based oligomer is particularly preferable because a first ink having excellent curing properties and excellent adhesiveness can be obtained in a case where this oligomer is used. One kind of oligomer may be used singly, or two or more kinds of oligomers may be used in combination.

Examples of the urethane (meth)acrylate-based oligomer include an aliphatic urethane (meth)acrylate-based oligomer, an aromatic urethane (meth)acrylate-based oligomer, and the like. For details, Oligomer Handbook (supervised by Junji Furukawa, The Chemical Daily Co., Ltd.) can be referred to.

Examples of the urethane (meth)acrylate-based oligomer include U-2PPA, U-4HA, U-6HA, U-6LPA, U-15HA, U-324A, UA-122P, UA5201, UA-512, and the like manufactured by SHIN-NAKAMURA CHEMICAL CO, LTD.; CN964A85, CN964, CN959, CN962, CN963J85, CN965, CN982B88, CN981, CN983, CN996, CN9002, CN9007, CN9009, CN9010, CN9011, CN9178, CN9788, and CN9893 manufactured by Sartomer Japan, Inc.; EB204, EB230, EB244, EB245, EB270, EB284, EB285, EB810, EB4830, EB4835, EB4858, EB1290, EB210, EB215, EB4827, EB4830, EB4849, EB6700, EB204, EB8402, EB8804, and EB8800-20R manufactured by Daicel Scitech, and the like.

Examples of the amine-modified polyester-based oligomer include EB524, EB80, and EB81 manufactured by Daicel Scitech, CN550, CN501, and CN551 manufactured by Sartomer Japan, Inc., and GENOMER 5275 manufactured by RAHN AG.

From the viewpoint of satisfying both the curing properties and adhesiveness, the content of the oligomer with respect to the total mass of the first ink is preferably 1% to 10% by mass, more preferably 2% to 8% by mass, and even more preferably 3% to 7% by mass.

More specifically, it is possible to use commercially available products described in Shinzo Yamashita, "Handbook of Crosslinking Agents" (1981, Taiseisha Inc.); Kiyomi Kato, "Handbook of UV·EB Curing (Raw Materials)" (1985, Kobunshi Kankokai); RadTech Japan, "Application and Market of UV·EB Curing Technology", p. 79 (1989, CMC Publishing CO., LTD.); and Eiichiro Takiyama, "Handbook of Polyester Resin" (1988, NIKKAN KOGYO SHIMBUN, LTD.) and to use radically polymerizable or crosslinkable monomers, oligomers, and polymers known in the related art.

In a case where the first curable compound is a monomer, the molecular weight thereof is preferably lower than 1,000, more preferably equal to or lower than 500, and even more preferably equal to or lower than 300.

In a case where the first curable compound contains an oligomer, the weight-average molecular weight of the oligomer is preferably 1,000 to 10,000, and more preferably 1,000 to 5,000.

The weight-average molecular weight is measured by the gel permeation chromatography method (GPC method) and expressed in terms of standard polystyrene. For example, HLC-8220GPC (manufactured by Tosoh Corporation) is used as a GPC system, three columns consisting of TSKgeL SuperHZM-H, TSKgeL SuperHZ4000, and TSKgeL SuperHZ2000 (manufactured by Tosoh Corporation, 4.6 mm ID×15 cm) are used, and tetrahydrofuran (THF) is used as an eluent. Furthermore, GPC is performed using a differential refractive index (RI) detector under the conditions of a sample concentration of 0.35% by mass, a flow rate of 0.35 ml/min, a sample injection amount of 10 μl, and a measurement temperature of 40° C. The calibration curve is prepared from 8 samples of "Standard sample TSK standard, polystyrene" manufactured by Tosoh Corporation: "F-40", "F-20", "F-4", "F-1", "A-5000", "A-2500", "A-1000", and "n-propylbenzene".

From the viewpoint of the hardness of the infrared absorbing image obtained after curing, the number of functional groups of the first curable compound is preferably 1 to 15, and more preferably 1 to 6.

One kind of first curable compound may be used singly, or two or more kinds of first curable compounds may be used in combination.

In the first ink, from the viewpoint of adhesiveness, the total content of the first curable compound with respect to the total mass of the first ink is preferably 50% to 95% by mass, more preferably 65% to 95% by mass, and even more preferably 70% to 90% by mass.

In the first ink, from the viewpoint of curing properties, the content of the polyfunctional monomer with respect to the total content of the radically polymerizable monomer is preferably equal to or higher than 70% by mass, more preferably 70% to 100% by mass, and even more preferably 80% to 100% by mass.

(Organic Solvent)

In the first ink, the content of an organic solvent is preferably lower than 3% by mass with respect to the total mass of the first ink. It is more preferable that the first ink do not contain an organic solvent (that is, the content of an organic solvent is more preferably lower than 1% by mass with respect to the total mass of the first ink).

In a case where the content of an organic solvent in the first ink is lower than 3% by mass with respect to the total mass of the first ink, irregularities easily occur after the infrared absorbing image is recorded, which makes it difficult to obtain undetectability of the infrared absorbing image. However, with the ink jet recording method of the present disclosure, even though the content of an organic solvent in the first ink is lower than 3% by mass with respect to the total mass of the first ink, the infrared absorbing image can exhibit excellent undetectability.

(Radical Polymerization Initiator)

In the present disclosure, it is preferable that the first ink contain a radical polymerization initiator.

The radical polymerization initiator is more preferably a radical photopolymerization initiator.

Examples of the radical polymerization initiator include (a) aromatic ketones, (b) acylphosphine compound, (c) aromatic onium salt compound, (d) organic peroxide, (e) thio compound, (f) hexaarylbiimidazole compound, (g) ketoxime ester compound, (h) borate compound, (i) azinium compound, (j) metallocene compound, (k) active ester compound, (l) carbon halogen bond-containing compound, (m) alkylamine compound, and the like. As these radical polymerization initiators, the above compounds (a) to (m) may be used singly or used in combination. The above radical polymerization initiators are specifically described, for example, in paragraphs "0090" to "0116" of JP2009-185186A.

In the present disclosure, one kind of radical polymerization initiator may be used singly, or two or more kinds of radical polymerization initiators may be used in combination.

As the radical polymerization initiator, for example, an acylphosphine compound, an α-hydroxyketone compound, and/or an α-aminoketone compound are preferable. Among these, either or both of the acylphosphine compound and/or α-aminoketone compounds are more preferable, and the acylphosphine compound is even more preferable.

As the acylphosphine compound, for example, bis(2,4,6-trimethylbenzoyl)phenylphosphine oxide, bis(2,6-dimethylbenzoyl)phenylphosphine oxide, bis(2,4,6-trimethylbenzoyl)-2-methoxyphenylphosphine oxide, bis(2,6-dimethylbenzoyl)-2-methoxyphenylphosphine oxide, bis(2,4,6-trimethylbenzoyl)-2,4-dimethoxyphenylphosphine oxide, bis(2,6-dimethylbenzoyl)-2,4-dimethoxyphenylphosphine oxide, bis(2,4,6-trimethylbenzoyl)-2,4-dipentyloxyphenylphosphine oxide, bis(2,6-dimethylbenzoyl)-2,4-dipentyloxyphenylphosphine oxide, 2,4,6-trimethylbenzoylethoxyphenylphosphine oxide, 2,6-dimethylbenzoylethoxyphenylphosphine oxide, 2,4,6-trimethylbenzoylmethoxyphenylphosphine oxide, bis(2,6-dimethoxybenzoyl)-2,4,4-trimethylpentylphenylphosphine oxide, 2,4,6-trimethylbenzoyldiphenylphosphine oxide (LUCIRIN TPO, manufactured by BASF SE), 2,6-dimethylbenzoylmethoxyphenylphosphine oxide, 2,4,6-trimethylbenzoyl(4-pentyloxyphenyl)phenylphosphine oxide, and 2,6-dimethylbenzoyl(4-pentyloxyphenyl)phenylphosphine oxide are suitable.

As the acylphosphine oxide compound, among these, bis(2,4,6-trimethylbenzoyl)phenylphosphine oxide (IRGACURE 819, manufactured by BASF SE) and bis(2,6-dimethoxybenzoyl)-2,4,4-trimethylpentylphenylphosphine oxide are preferable, and bis(2,4,6-trimethylbenzoyl)phenylphosphine oxide is particularly preferable.

As the aromatic ketones, either or both of an α-hydroxyketone compound and/or an α-aminoketone compound are preferable.

As the α-hydroxyketone compound, known compounds can be used. Examples thereof include 1-[4-(2-hydroxyethoxy)phenyl]-2-hydroxy-2-methyl-1-propan-1-one, 2-hydroxy-2-methyl-1-phenylpropan-1-one, 1-hydroxycyclohexylphenyl ketone, and the like. Among these, a 1-hydroxycyclohexylphenyl ketone compound is preferable. In the present disclosure, the 1-hydroxycyclohexylphenyl ketone compound also includes a compound in which 1-hydroxycyclohexylphenyl ketone is substituted with an arbitrary substituent. The substituent can be arbitrarily selected as long as the radical polymerization initiator can perform its function. Specifically, examples of the substituent include an alkyl group having 1 to 4 carbon atoms.

As the α-aminoketone compound, known compounds can be used. Specifically, examples thereof include 2-methyl-1-phenyl-2-morpholinopropan-1-one, 2-methyl-1-[4-(hexyl)phenyl]-2-morpholinopropan-1-one, 2-ethyl-2-dimethylamino-1-(4-morpholinophenyl)butan-1-one, 2-benzyl-2-dimethylamino-1-(4-morpholinophenyl)-butan-1-one, 2-dimethylamino-2-(4-methylbenzyl)-1-(4-morpholin-4-ylphenyl)-butan-1-one, and the like. As commercially available products, for example, IRGACURE907 (2-methyl-1-(4-methylthiophenyl)-2-morpholinopropan-1-one), IRGACURE369 (2-benzyl-2-dimethylamino-1-(4-morpholinophenyl)-1-butanone), IRGACURE379 (2-(dimethylamino)-2-[(4-methylphenyl)methyl]-1-[4-(4-morpholinyl)phenyl]-1-butanone) (manufactured by BASF SE), and the like are preferable.

In the present disclosure, from the viewpoint of adhesiveness, a radical polymerization initiator having a weight-average molecular weight of 500 to 3,000 may also be used. The weight-average molecular weight is more preferably 800 to 2,500, and even more preferably 1,000 to 2,000. In a case where the molecular weight is equal to or higher than 500, an ink composition is obtained which inhibits the compound contained in the first ink from being eluted from a cured film. In contrast, in a case where the molecular weight is equal to or lower than 3,000, the radical polymerization initiator causes less steric hindrance, a degree of freedom of the radical polymerization initiator in a liquid/film is maintained, and high sensitivity can be obtained.

The weight-average molecular weight of the radical polymerization initiator can be measured by the method described above.

Examples of the radical polymerization initiator having a weight-average molecular weight of 500 to 3,000 include SPEEDCURE 7010 (1,3-di({α-[1-chloro-9-oxo-9H-thioxanthen-4-yl]]oxy}acetylpoly[oxy(1-methylethylene)])oxy)-2,2-bis({α-[1-chloro-9-oxo-9H-thioxanthen-4-yl]oxy}acetylpoly[oxy(1-methylethylene)])oxymethyl)propane, CAS No. 1003567-83-6), OMNIPOL TX (Polybutylenegycol bis(9-oxo-9H-thioxanthenyloxy)acetate, CAS No. 813452-37-8), OMNIPOL BP (Polybutyleneglycol bis(4-benzoylphenoxy)acetate, CAS No. 515136-48-8), and the like. The content of the radical polymerization initiator, which has a weight-average molecular weight of 500 to 3,000, with respect to the total mass of the first ink is preferably 0.01% to 10% by mass, more preferably 0.05% to 8.0% by mass, even more preferably 0.1% to 5.0% by mass, and particularly preferably 0.1% to 2.4% by mass. In a case where the content of the radical polymerization initiator is within the above range, excellent curing properties are obtained.

The first ink may also contain, as a radical polymerization initiator, a compound functioning as a sensitizer (hereinafter, also simply called "sensitizer") so that the decomposition of the radical polymerization initiator is accelerated by the absorption of specific active energy rays.

Examples of the sensitizer include polynuclear aromatic compounds (for example, pyrene, perylene, triphenylene, 2-ethyl-9,10-dimethoxyanthracene, and the like), xanthenes (for example, fluorescein, eosin, erythrosin, rhodamine B, rose bengal, and the like), cyanines (for example, thiacarbocyanine, oxacarbocyanine, and the like), merocyanines (for example, merocyanine, carbomerocyanine, and the like), thiazines (for example, thionine, methylene blue, toluidine blue, and the like), acridines (for example, acridine orange, chloroflavine, acryflavine, and the like), anthraquinones (for example, anthraquinone and the like), squaryliums (for example, squarylium and the like), coumarins (for example, 7-diethylamino-4-methylcoumarin and the like), thioxanthones (for example, isopropylthioxanthone and the like), thiochromanones (for example, thiochromanone and the like), and the like.

As the sensitizer, among these, thioxanthones are preferable, and isopropylthioxanthone is more preferable.

One kind of sensitizer may be used singly, or two or more kinds of sensitizers may be used in combination.

The total content of the radical polymerization initiator with respect to the total mass of the first ink is preferably 1.0% to 15.0% by mass, and more preferably 1.5% to 10.0% by mass. In a case where the total content of the radical polymerization initiator is within the above range, excellent curing properties are obtained.
(Surfactant)

A surfactant may be added to the first ink so that the ink is stably jetted for a long period of time.

Examples of the surfactant include those described in JP1987-173463A (JP-S62-173463A) and JP1987-183457A (JP-S62-183457A). Examples thereof include anionic surfactants such as dialkyl sulfosuccinates, alkyl naphthalene sulfonates, and fatty acid salts, nonionic surfactants such as polyoxyethylene alkyl ethers, polyoxyethylene alkyl allyl ethers, acetylene glycols, and polyoxyethylene polyoxypropylene block copolymers, and cationic surfactants such as alkylamine salts and quaternary ammonium salts. Furthermore, as the aforementioned surfactant, a fluorine-based surfactant (for example, an organic fluoro compound or the like) or a silicone-based surfactant (for example, a polysiloxane compound or the like) may also be used. The organic fluoro compound is preferably hydrophobic. Examples of the organic fluoro compound include a fluorine-based surfactant, an oil-like fluorine-based compound (for example, fluorine oil), and a solid-like fluorine compound resin (for example, a tetrafluoroethylene resin). Examples of these include the compounds described in JP1982-009053B (JP-S57-009053B) (sections 8 to 17) and JP1987-135826A (JP-S62-135826A).

The aforementioned polysiloxane compound is preferably a modified polysiloxane compound obtained by introducing an organic group into some of methyl groups of dimethylpolysiloxane. Examples of the modification include, but are not particularly limited to, polyether modification, methylstyrene modification, alcohol modification, alkyl modification, aralkyl modification, fatty acid ester modification, epoxy modification, amine modification, amino modification, mercapto modification, and the like. These modification methods may be used in combination. Particularly, from the viewpoint of improving jetting stability in an ink jet, a polyether-modified polysiloxane compound is preferable.

Examples of the polyether-modified polysiloxane compound include SILWET L-7604, SILWET L-7607N, SILWET FZ-2104, and SILWET FZ-2161 (manufactured by Nippon Unicar Co., Ltd.), BYK-306, BYK-307, BYK-331, BYK-333, BYK-347, BYK-348, and the like (manufactured by BYK-Chemie GmbH), and KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (manufactured by Shin-Etsu Chemical Co., Ltd.).

As a surfactant, among these, for example, a silicone-based surfactant is preferable.

The content of the surfactant in the first ink is appropriately selected according to the purpose of use. The content of the surfactant with respect to the total mass of the composition is preferably 0.0001% to 5% by mass, and more preferably 0.001% to 2% by mass.
(Polymerization Inhibitor)

From the viewpoint of preservability and inhibition of ink jet head clogging, the first ink may also contain a polymerization inhibitor.

The content of the polymerization inhibitor is preferably 200 ppm to 20,000 ppm with respect to the total mass of the first ink.

Examples of the polymerization inhibitor include a nitroso-based polymerization inhibitor, a hindered amine-based polymerization inhibitor, hydroquinone, benzoquinone, p-methoxyphenol, 2,2,6,6-tetramethylpiperidine 1-oxyl (TEMPO), 4-hydroxy-2,2,6,6-tetramethylpiperidine 1-oxyl (TEMPOL), Cupferron A1, a mixture of 2,6-bis(1,1-dimethylethyl)-4-(phenylmethylene)-2,5-cyclohexazin-1-one and glycerol triacrylate (mass ratio: 20:80), and the like.
(Other Components)

In the present disclosure, if necessary, the first ink may contain, in addition to the above components, a co-sensitizer, an ultraviolet absorber, an antioxidant, an antifading agent, conductive salts, a solvent, a polymer compound, a basic compound, and the like. As those other components, known components can be used, and examples thereof include those described in JP2009-221416A.

~Physical Properties of First Ink~

The viscosity of the first ink is preferably in a range of 0.5 mPa·s to 20 mPa·s, and more preferably in a range of 5 mPa·s to 15 mPa·s.

The viscosity is measured using VISCOMETER TV-22 (manufactured by TOKI SANGYO CO., LTD.) under the condition of 25° C.

The surface tension of the first ink at 25° C. (+1° C.) is preferably equal to or lower than 60 mN/m, more preferably 20 mN/m to 50 mN/m, and even more preferably 20 mN/m to 40 mN/m. In a case where the surface tension of the first ink is within the above range, this is advantageous for inhibiting the curling of the substrate. The surface tension is measured using Automatic Surface Tensiometer CBVP-Z (manufactured by Kyowa Interface Science Co., LTD.) under the condition of 25° C.

<Step of Semi-Curing>

The ink jet recording method in the present disclosure includes a step of semi-curing the infrared absorbing image by irradiating the image with active energy rays (also called semi-curing step).

Because the ink jet recording method has the step of semi-curing, the image recorded by the infrared absorbing image and the non-infrared absorbing image can be flattened, and the adhesiveness between the first ink and the substrate and between the first ink and the second ink can be improved. As a result, the undetectability of the infrared absorbing image recorded can be improved.

In the present disclosure, "semi-curing" means partial curing (partially cured), which is a state where an ink (the first ink and/or the undercoat composition which will be described later) is partially cured by the progress of a curing reaction but is not fully cured.

In a case where either or both of the first ink and the undercoat composition which will be described later are in a semi-cured state, the degree of curing may not be uniform. For example, it is preferable that curing proceed in the depth direction of the first ink and/or the undercoat composition which will be described later.

The exposure dose of the active energy ray irradiation required for the semi-curing varies with the composition (for example, in a case where the composition contains the radical polymerization initiator which will be described later, the exposure dose varies with the type, content, and the like of the radical polymerization initiator). The exposure dose is preferably about 1 mJ/cm$^2$ to 100 mJ/cm$^2$, more preferably 1 mJ/cm$^2$ to 50 mJ/cm$^2$, and even more preferably 1 mJ/cm$^2$ to 30 mJ/cm$^2$.

Examples of active energy ray exposure units for semi-curing the ink composition include an ultraviolet light emitting diode (UV-LED).

Furthermore, as the active energy ray exposure units for semi-curing, for example, a metal halide lamp, a mercury lamp, and an LED light source are suitable. Among these, an LED light source is preferable.

In the step of semi-curing the first ink, active energy ray irradiation may be performed in the atmosphere with an oxygen concentration equal to or lower than 0.1% by volume as described above. However, from the viewpoint of adhesiveness with the ink composition, the active energy ray irradiation is preferably performed in an atmosphere with an oxygen concentration higher than 0.1% by volume, and more preferably performed in the atmosphere.

In the present disclosure, in a case where the radically polymerizable first ink is used in the presence of oxygen having a radical polymerization inhibitory effect and partially cured by active energy rays, the curing of the first ink proceeds further on the inside of the ink than on the outside of the ink.

Particularly, due to the influence of oxygen in the air, the polymerization reaction tends to be further inhibited on the surface of the first ink than on the inside of the first ink. Therefore, by controlling the active energy ray application condition, it is possible to semi-cure the first ink.

The active energy ray irradiation accelerates the occurrence of active species by the decomposition of the radical polymerization initiator. In addition, as the number and temperature of the active species increase, polymerizable or crosslinkable materials are polymerized or crosslinked by the active species, and thus the curing reaction is accelerated.

Furthermore, the active energy ray irradiation can also suitably result in thickening (increase in viscosity).

In the semi-curing step, in a case where the curing reaction is based, for example, on an ethylenically unsaturated compound, whether the first ink is in "semi-cured" state can be checked by quantitatively measuring an unpolymerized rate by the reaction rate of an ethylenically unsaturated group.

In a case where the first ink is semi-cured by the polymerization reaction of an ethylenically unsaturated compound whose polymerization is initiated by the active energy ray irradiation, from the viewpoint of improving the rub resistance of a record, an unpolymerized rate (A (after polymerization)/A (before polymerization)) is preferably equal to or higher than 0.2 and equal to or lower than 0.9, more preferably equal to or higher than 0.3 and equal to or lower than 0.9, and particularly preferably equal to or higher than 0.5 and equal to or lower than 0.9.

A (after polymerization) is the absorbance at the infrared absorption peak of an ethylenic unsaturated group after a polymerization reaction, and A (before polymerization) is the absorbance at the infrared absorption peak of the ethylenically unsaturated group before the polymerization reaction. For example, in a case where the ethylenically unsaturated compound contained in the first ink is an acrylate monomer or a methacrylate monomer, an absorption peak based on a polymerizable group (an acrylate group or a methacrylate group) can be observed at around 810 cm-1, and the aforementioned unpolymerized rate is preferably defined as the absorbance at the peak.

As means for measuring the infrared absorption spectrum, commercially available infrared spectrophotometers can be used. Any of transmission or refection infrared spectrophotometers may be used, and it is preferable to appropriately select an infrared spectrophotometer according to the form of sample. For example, the infrared absorption spectrum can be measured using an infrared spectrophotometer FTS-6000 manufactured by Bio-Rad Laboratories, Inc.

In a case where two or more kinds of first inks are to be jetted in the ink jet recording method according to the present disclosure, it is preferable that the ink jet recording method include a step of jetting one kind of first ink and then semi-curing the jetted first ink before the other kind of first ink composition is jetted.

In addition, it is preferable that the ink jet recording method according to the present disclosure include a step of jetting an ink composition and a step of semi-curing the jetted ink composition, in which these steps are performed for each ink composition used (the first ink, the second ink, or the undercoat composition). In a case where this aspect is adopted, the effects of the present disclosure can be exerted further.

The step of semi-curing each ink composition that is performed after each ink composition is jetted in a case where two or more kinds of ink compositions are applied is the same as the aforementioned step of semi-curing the ink composition by irradiating the ink composition with active energy rays. The exposure device used, the exposure conditions, and the preferred aspects are the same for these steps.

Furthermore, in a case where a step of curing the ink composition is carried out by performing the active energy ray irradiation, which will be described later, immediately after the semi-curing step, the ink jet recording method according to the present disclosure may or may not include a step of semi-curing the last ink composition (second ink) jetted. However, from the viewpoint of costs or convenience, it is preferable that the ink jet recording method do not include such a step.

In a case where two or more kinds of ink compositions are to be jetted, it is preferable that all of the ink compositions be jetted on an undercoat layer, on a jetted ink composition, or on a semi-cured ink composition. That is, it is preferable that all of the ink compositions be in direct contact with each other or jetted on an undercoat layer via another ink composition layer. In this case, from the viewpoint of adhesiveness, it is preferable that the undercoat layer be semi-cured.

The ink jet recording method according to the present disclosure may also include steps (other steps) in addition to the above steps.

The ink jet recording method can include known steps as those other steps.

<Step of Recording Non-Infrared Absorbing Image>

The ink jet recording method of the present disclosure includes a step of recording a non-infrared absorbing image by applying a second ink, which has a content of the infrared absorber of lower than 0.1% by mass and contains a second curable compound, to a surface of the substrate with the semi-cured infrared absorbing image by an ink jet method.

The second ink is not particularly limited as long as the second ink has a content of the infrared absorber of lower than 0.1% by mass and contains the second curable compound. For example, the second ink may be a second ink A which has a colorant content of lower than 0.1% by mass and contains the second curable compound or a second ink B which contains a colorant other than the aforementioned infrared absorber and contains the second curable compound.

The non-infrared absorbing image refers to an image in which the content of the infrared absorber is lower than 0.1% by mass with respect to the total mass of the image. In a case where the content of the infrared absorber is lower than 0.1% by mass, this means that the image substantially does not contain the infrared absorber. The content of the infrared absorber may be 0% by mass with respect to the total mass of the image.

The present step may be a step of applying the second ink to an area including at least a part of the area of the substrate in which the infrared absorbing image is recorded and an area other than the area in which the infrared absorbing image is recorded, a step of applying the second ink to an area including the entirety of the area of the substrate in which the infrared absorbing image is recorded, or a step of applying the second ink to an area other than the area of the substrate in which the infrared absorbing image is recorded by bringing the second ink into contact with the periphery of the infrared absorbing image.

From the viewpoint of improving the undetectability of the infrared absorbing image by inhibiting the occurrence of irregularities on the surface on which the infrared absorbing image and the non-infrared absorbing image are exposed, the present step is preferably the step of applying the second ink to an area including at least a part of the area of the substrate in which the infrared absorbing image is recorded and an area other than the area in which the infrared absorbing image is recorded, and more preferably the step of applying the second ink to an area including the entirety of the area of the substrate in which the infrared absorbing image is recorded.

Specifically, the step of applying the second ink to an area including at least a part of the area of the substrate in which the infrared absorbing image is recorded and an area other than the area in which the infrared absorbing image is recorded is performed, for example, by superposing a non-infrared absorbing image on a part of the infrared absorbing image and recording the non-infrared absorbing image as well in an area in which the infrared absorbing image is not recorded.

Furthermore, specifically, the step of applying the second ink to an area including the entirety of the area of the substrate in which the infrared absorbing image is recorded is performed, for example, by recording a non-infrared absorbing image so that this image covers the entire area of the surface on which the infrared absorbing image is exposed and recording the non-infrared absorbing image as well in an area in which the infrared absorbing image is not recorded.

From the viewpoint of the adhesiveness between the infrared absorbing image and the non-infrared absorbing image and the flexibility of the non-infrared absorbing image, the amount of the non-infrared absorbing image formed (that is, the amount of coating) per unit area is preferably 0.05 $g/m^2$ to 5 $g/m^2$, and more preferably 0.06 $g/m^2$ to 3 $g/m^2$.

In a case where the maximum amount of the second ink (of each color) applied per unit area is regarded as 1, the amount of the non-infrared absorbing image formed per unit area is, based on mass, preferably within a range of 0.05 to 5, more preferably within a range of 0.07 to 4, and particularly preferably within a range of 0.1 to 3.

In a case where the second ink is jetted by an ink jet method, it is preferable to keep the temperature of the ink as constant as possible. In the present disclosure, the temperature of the second ink is preferably controlled within a range of a set temperature±5° C., more preferably controlled within a range of a set temperature±2° C., and even more preferably controlled within a range of a set temperature±1° C.

In the ink jet recording method according to the present disclosure, one kind of second ink may be used singly, or two or more kinds of second inks may be used.

[Second Ink A and Second Ink B]

The second ink A in the present disclosure has a colorant content of lower than 1% by mass and contains a second curable compound. The colorant content of lower than 1% by mass means that the ink substantially does not contain a colorant. The colorant content is preferably 0% by mass.

The second ink B in the present disclosure contains a colorant other than the infrared absorber and also contains the second curable compound.

(Second Curable Compound)

The second ink in the present disclosure contains a second curable compound.

As the second curable compound, the same compound as the first curable compound described above can be used, and the preferred aspects thereof are also the same.

The second curable compound may be a solid or liquid.

In the ink jet recording method of the present disclosure, the absolute value of a difference between a refractive index of the first curable compound and a refractive index of the second curable compound is equal to or lower than 0.07.

As a result, it is difficult to visually recognize the infrared absorbing image, and the undetectability thereof can be improved.

From the viewpoint described above, the lower the absolute value of the difference between the refractive index of the first curable compound and the refractive index of the second curable compound, the more preferable. The absolute value is more preferably equal to or lower than 0.04, and even more preferably equal to or lower than 0.01.

In the present disclosure, in a case where a plurality of compounds is used as the first curable compound or the second curable compound, from the mass ratio between the compounds as the first curable compound or the second curable compound, the average of the refractive index is determined and adopted as the refractive index of the first curable compound or the second curable compound.

The refractive index is measured by a V-block method using a commercially available refractometer (for example, precision refractometer KPR-3000, manufactured by Shimadzu Corporation) under the condition of a wavelength of 589 nm and 25° C.

—Oligomer—

It is preferable that the second curable compound in the present disclosure contain an oligomer.

In the present disclosure, it is preferable that at least one of the first curable compound or the second curable compound contain an oligomer. It is more preferable that the first curable compound and the second curable compound contain an oligomer.

In a case where the first curable compound and the second curable compound contain an oligomer, it is possible to further improve the adhesiveness between the first curable compound and the second curable compound and to flatten better the infrared absorbing image and the non-infrared absorbing image.

The oligomer contained in the second curable compound has the same definition as the oligomer contained in the first curable compound, and the preferred aspects thereof are also the same.

From the viewpoint of satisfying both the curing properties and the adhesiveness, the content of the oligomer with respect to the total mass of the second ink is preferably 1% to 10% by mass, more preferably 2% to 8% by mass, and even more preferably 3% to 7% by mass.

(Colorant)

The colorant contained in the second ink is not particularly limited as long as it is a colorant other than the aforementioned infrared absorber, and known colorants can be used. Examples of the colorant include coloring agents such as dyes and pigments.

Among these, pigments and oil-soluble dyes having excellent weather fastness and high color reproducibility are preferable. Such pigments and dyes to be used can be arbitrarily selected from known colorants such as soluble dyes.

As the colorant, it is preferable to select a compound that does not function as a polymerization inhibitor, because such a compound does not reduce the sensitivity of the curing reaction performed by active radiation.

The pigments that can be used in the present disclosure are not particularly limited. For example, it is possible to use the organic or inorganic pigments given the following numbers listed in the color index.

According to the purpose, it is possible to use Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, and Pigment Orange 13, 16, 20, and 36 as red or magenta pigments, Pigment Blue 1, 15, 15:1, 15:2, 15:3, 15:4, 15:6, 16, 17-1, 22, 27, 28, 29, 36, and 60 as blue or cyan pigments, Pigment Green 7, 26, 36, and 50 as green pigments, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, and 193 as yellow pigments, Pigment Black 7, 28, and 26 as black pigments, Pigment White 6, 18, and 21 as white pigments, and the like.

In the present disclosure, it is also possible to use dispersed dyes dissolved in water-immiscible organic solvents. Generally, dispersed dyes also include water-soluble dyes. However, in the present disclosure, it is preferable to use dispersed dyes dissolved in water-immiscible organic solvents.

Specifically, as the dispersed dyes, for example, Color Index (C. I.) Disperse Yellow 5, 42, 54, 64, 79, 82, 83, 93, 99, 100, 119, 122, 124, 126, 160, 184:1, 186, 198, 199, 201, 204, 224, and 237; C. I. Disperse Orange 13, 29, 31:1, 33, 49, 54, 55, 66, 73, 118, 119, and 163; C. I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; C. I. Disperse Violet 33; C. I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; C. I. Disperse Green 6:1 and 9; and the like are preferable.

It is preferable that the colorant be appropriately dispersed in the second ink after being added to the second ink. For dispersing colorants, for example, it is possible to use dispersion apparatuses such as a ball mill, a sand mill, an attritor, a roll mill, an agitator, a Henschel mixer, a colloid mill, an ultrasonic homogenizer, a pearl mill, a wet-type jet mill, and a paint shaker.

In preparing the second ink, the colorant may be directly added together with the respective components. Furthermore, in order to improve dispersibility, the colorant can be added to a solvent or a dispersion medium such as the second curable compound used in the present disclosure in advance, uniformly dispersed or dissolved, and then mixed with the second ink.

In the present disclosure, in order to avoid the deterioration of solvent resistance caused in a case where a solvent remains in a cured image and the issue of volatile organic compound (VOC) in a residual solvent, it is preferable that the colorant be added to a dispersion medium such as the second curable compound in advance and then mixed with the second ink. One kind of colorant or two or more kinds of colorants may be appropriately selected and used.

In a case where a colorant such as a pigment that stays in a solid state in the second ink is used, it is preferable to select the colorant, dispersant, and dispersion medium and to set the dispersion condition and filtering condition, so that the average particle size of the colorant particles is preferably 0.005 μm to 0.5 μm, more preferably 0.01 μm to 0.45 μm, and even more preferably 0.015 μm to 0.4 μm. It is preferable to control the particle size as described above, because then the head nozzle clogging can be inhibited, and the storage stability, transparency, and curing sensitivity of the second ink can be maintained.

The colorant content in the second ink is appropriately selected according to the color and the purpose of use, but is preferably 0.01% to 30% by mass with respect to the total mass of the second ink.

(Other Components)

In the present disclosure, if necessary, the second ink may contain, in addition to the above components, a co-sensitizer, an ultraviolet absorber, an antioxidant, an antifading agent, conductive salts, a solvent, a polymer compound, a basic compound, and the like. As those other components, known components can be used, and examples thereof include those described in JP2009-221416A.

For the first curable compound and the second curable compound, for example, the following aspects are preferable.

In a case where the following aspects are satisfied, the infrared absorbing image and the non-infrared absorbing image are further flattened, and the undetectability is further improved. In addition, the adhesiveness between the first ink and the second ink is further improved.

(1) It is preferable that the compound contained as the first curable compound and the compound contained as the second curable compound are the same type of compounds.

"Same type of compounds" means that the compounds (for example, compounds having a (meth)acryloyl group) have the same partial structure (for example, a (meth)acryloyl group or a urethane bond). For example, in a case where both the first curable compound and second curable compound contain acrylate, these compounds are the same type of compounds containing acrylate. However, for instance, in a case where the first curable compound contains acrylate while the second curable compound contains urethane instead of acrylate, these compounds are different types of compounds containing different compounds.

From the viewpoint of the undetectability and adhesiveness described above, it is preferable that the first curable compound and the second curable compound be the same compound.

(2) It is preferable that the number of functional groups in the first curable compound be the same as the number of functional groups in the second curable compound. In a case where the aspect (2) is satisfied, the infrared absorbing image and the non-infrared absorbing image are further flattened, and the undetectability is improved.

In a case where the ink contains a plurality of compounds as the first curable compound and/or the second curable compound, for each of the plurality of compounds, whether or not the number of functional groups in a certain first curable compound is the same as the number of functional groups in a certain second curable compound is checked. In a case where the curable compounds in the first and second inks have the same number of functional groups, the smaller the difference is between the content (% by mass) of the curable compound in the first ink and the content (% by mass) of the curable compound in the second ink, the further the undetectability is improved.

It is preferable that a compound whose content is equal to or higher than 50% by mass with respect to the total mass of the first curable compound and a compound whose content is equal to or higher than 50% by mass with respect to the total mass of the second curable compound be the same compound.

In a case where the above aspect is satisfied, the infrared absorbing image and the non-infrared absorbing image are further flattened, and the undetectability is improved. In addition, the adhesiveness between the first ink and the second ink is further improved.

From the viewpoint described above, it is more preferable that a compound whose content is equal to or higher than 70% by mass with respect to the total mass of the first curable compound and a compound whose content is equal to or higher than 70% by mass with respect to the total mass of the second curable compound be the same compound.

—Physical Properties of Second Ink—

The preferred ranges of the viscosity and surface tension of the second ink are the same as the preferred ranges of the viscosity and surface tension of the first ink described above.

The absolute value of a difference between the surface tension of the first ink and the surface tension of the second ink is preferably 0 mN/m to 3 mN/m at 25° C. In a case where this aspect is satisfied, it is possible to further reduce the visibility of the infrared absorbing image. As a result, it is possible to make difficult to recognize the infrared absorbing image even though the image is touched.

From the same viewpoint as described above, the absolute value of a difference between the surface tension of the first ink and the surface tension of the second ink is preferably 0 mN/m to 1 mN/m at 25° C.

The absolute value of a difference between the viscosity of the first ink and the viscosity of the second ink is preferably 0 mPa·s to 5 mPa·s at 25° C. In a case where this aspect is satisfied, it is possible to further reduce the visibility of the infrared absorbing image. As a result, it is possible to make difficult to recognize the infrared absorbing image even though the image is touched.

From the same viewpoint as described above, the absolute value of a difference between the viscosity of the first ink and the viscosity of the second ink is preferably 0 mPa·s to 3 mPa·s at 25° C.

<Step of Curing>

The ink jet recording method of the present disclosure has a step of curing the semi-cured infrared absorbing image and non-infrared absorbing image (plus an undercoat composition in a case where an undercoat layer semi-curing step which will be described later is performed) by irradiating the images with active energy rays (full curing step).

In the present disclosure, "full curing" means a state where the inside and surface of the first ink and the second ink (the first ink, the second ink, and the undercoat composition in a case where the undercoat layer semi-curing step which will be described later is performed) are fully cured. Whether the inks are in "full curing" state can be determined by pressing plain paper (for example, copy paper C2 manufactured by Fuji Xerox Co., Ltd., product code V436) on the images with uniform force (force constant within a range of 500 mN/cm² to 1,000 mN/cm²) and checking whether the liquid surface is transferred to the plain paper. That is, in a case where no transfer occurs, it is possible to say that the inks are in a fully cured state.

The active energy rays in the present step are not particularly limited, but are preferably ultraviolet rays.

In the present step, it is preferable to perform curing by irradiating the inks with ultraviolet rays from a ultraviolet light emitting diode at a cumulative light intensity equal to or higher than 50 mJ/cm$^2$.

The cumulative light intensity of the active energy ray irradiation is preferably equal to or higher than 50 mJ/cm$^2$, and more preferably equal to or higher than 80 mJ/cm$^2$. The upper limit of the cumulative light intensity is not particularly limited, but is preferably equal to or lower than 2,000 mJ/cm$^2$, and more preferably equal to or lower than 1,000 mJ/cm$^2$.

The cumulative light intensity of the active energy ray irradiation includes the light intensity in the active energy ray irradiation for semi-curing the first ink described above. In a case where an undercoat layer forming step which will be described later is performed, the cumulative light intensity also includes the light intensity in the ultraviolet ray irradiation for semi-curing the undercoat composition. That is, the cumulative light intensity of the active energy ray irradiation is the total light intensity of active energy rays radiated until the entirety of the ink (the first ink, the second ink, or the undercoat composition) is fully cured after the initial jetting of the ink.

In the present step, the light intensity in each session of active energy ray irradiation may be selected so that the aforementioned cumulative light intensity is satisfied. The light intensity varies with the composition, particularly, the type, content, and the like of the radical polymerization initiator. The light intensity is preferably about 1 mJ/cm$^2$ to 500 mJ/cm$^2$.

The light source radiating the active energy rays is preferably an ultraviolet light emitting diode (UV-LED).

As UV-LED, for example, a purple LED having a main emission spectrum at a wavelength between 365 nm and 420 nm is marketed by NICHIA CORPORATION. In a case where a much shorter wavelength is required, the LED disclosed in U.S. Pat. No. 6,084,250A that can emit ultraviolet rays centered at a wavelength between 300 nm and 370 nm may be used. Other UV-LEDs are also available and can radiate ultraviolet rays in different wavelength bands. In the present disclosure, as an ultraviolet source, a UV-LED having a peak wavelength in a range of 340 nm to 400 nm is particularly preferable.

In the present step, it is preferable to cure the applied ink by irradiating the ink with ultraviolet rays in an atmosphere having an oxygen concentration equal to or lower than 0.1% by volume.

The oxygen concentration is preferably equal to or lower than 0.05% by volume, and more preferably equal to or lower than 0.01% by volume. The lower limit of the oxygen concentration may be 0% by volume. That is, the ink may be cured in an oxygen-free atmosphere. In a case where the oxygen concentration is within the above range, the obtained record has excellent heat-resistant adhesiveness and excellent surface curing properties.

The atmosphere having the above oxygen concentration can be adjusted by known methods without particular limitation. It is preferable to adjust the atmosphere by performing nitrogen purging.

<Undercoat Layer Forming Step>

The ink jet recording method of the present disclosure may have, before the step of recording an infrared absorbing image, a step of forming an undercoat layer by applying an undercoat composition, which contains an isocyanate group-containing compound, a radically polymerizable monomer, and a radical polymerization initiator, onto an impermeable substrate. In this case, the step of curing described above may be a step of irradiating the infrared absorbing image, the non-infrared absorbing image, and the undercoat layer with active energy rays.

In a case where the ink jet recording method of the present disclosure has the undercoat layer forming step, the adhesiveness between the substrate and the first ink can be further improved.

(Undercoat Composition)

It is preferable that the undercoat composition contain an isocyanate group-containing compound, a radically polymerizable monomer, and a radical polymerization initiator.

—Isocyanate Group-Containing Compound—

As the isocyanate group-containing compound (isocyanate compound) used in the undercoat composition, known isocyanate compounds can be used without particular limitation. The isocyanate compound may be an aliphatic isocyanate or an aromatic isocyanate. From the viewpoint of safety and stability, an aliphatic isocyanate is preferable.

In addition, as the isocyanate compound used in the present disclosure, commercially available products can also be used.

For example, TAKENATE series such as TAKENATE D103H, D204, D160N, D170N, D165N, D178NL, and D110N (manufactured by Mitsui Chemicals, Inc.) and CORONATE HX, HXR, HXL, HXLV, HK, HK-T, HL, and 2096 (manufactured by Nippon Polyurethane Industry Co., Ltd.) are preferable.

In addition, it is also possible to use commercially available products of binary liquid mixture-type adhesives consisting of an isocyanate compound and a polyol compound that will be described later, such as TM-550 and CAT-RT-37-2K (manufactured by Toyo-Morton, Ltd.) and X-series solvent-free adhesives such as XC233-2 and XA126-1 (manufactured by Dainichiseika Color & Chemicals Mfg. Co., Ltd.).

The content of the isocyanate group-containing compound with respect to the total mass of the undercoat composition is preferably 2% to 90% by mass, more preferably 5% to 80% by mass, and even more preferably 15% to 75% by mass.

—Radically Polymerizable Monomer—

As the radically polymerizable monomer, the same radically polymerizable monomer as that described above can be used, and the preferred ranges thereof are also the same.

The content of the radically polymerizable monomer with respect to the total mass of the undercoat composition is preferably 15% to 75% by mass, and more preferably 20% to 65% by mass.

—Radical Polymerization Initiator—

As the radical polymerization initiator, the same radical polymerization initiator as that described above can be used, and the preferred ranges thereof are also the same.

The content of the radical polymerization initiator with respect to the total mass of the undercoat composition is preferably 0.1% to 10% by mass, and more preferably 1% to 8% by mass.

—Other Components—

In the present disclosure, if necessary, the undercoat composition may contain, in addition to the above components, a co-sensitizer, an ultraviolet absorber, an antioxidant, an antifading agent, conductive salts, a solvent, a polymer compound, a basic compound, and the like. As those other components, known components can be used, and examples thereof include those described in JP2009-221416A.

<Undercoat Layer Semi-Curing Step>

The ink jet recording method of the present disclosure can have, between the step of forming an undercoat layer and the step of recording an infrared absorbing image, a step of semi-curing the undercoat composition, which is applied by the step of forming an undercoat layer, by irradiating the undercoat composition with active energy rays.

In a case where the ink jet recording method has this step, the adhesiveness between the infrared absorbing image and the undercoat layer and between the substrate and the undercoat layer can be further improved.

"Semi-curing" is as described above. The undercoat layer semi-curing step can be performed by the same method as the semi-curing step described above, and the preferred aspects thereof are also the same.

(Impermeable Substrate)

In the present disclosure, as a substrate, an impermeable substrate (also called non-permeable substrate) is used.

In a case where an infrared absorbing image is recorded on a non-permeable substrate, irregularities easily occur on the image. Therefore, the infrared absorbing image is more easily recognized in a case where the image is watched or touched. However, in a case where the ink jet recording method of the present disclosure is used, excellent undetectability can be obtained.

"Non-permeable" for the non-permeable substrate used in the present disclosure means that the substrate hardly absorbs or does not absorb water contained in an ink. Specifically, "non-permeable" means the properties represented by a water absorption amount equal to or smaller than 10.0 $g/m^2$.

The non-permeable substrate used in the present disclosure is not particularly limited, and examples thereof include a sheet-like substrate, a film-like substrate, and the like.

Examples of the non-permeable substrate include metals (for example, aluminum foil and the like), plastic films (for example, a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, and the like), plastics, glass, and the like.

Among these, substrates containing a thermoplastic resin such as polyvinyl chloride, polyethylene terephthalate, or polypropylene are preferable.

The non-permeable substrate may have undergone a surface treatment.

Examples of the surface treatment include, but are not limited to, a corona treatment, a plasma treatment, a flame treatment, a heat treatment, an abrasion treatment, a light irradiation treatment (UV treatment), and the like.

For example, in a case where a corona treatment is performed in advance on the surface of the non-permeable substrate before an ink is applied to the substrate to record an image, the surface energy of the non-permeable substrate increases, which facilitates the moistening of the surface of the non-permeable substrate and the adhesion of an ink to the non-permeable substrate. The corona treatment can be performed using, for example, CORONA MASTER (PS-10S, manufactured by Shinko Denki Co., Ltd.) and the like. The conditions for the corona treatment may be appropriately selected according to the type of the non-permeable substrate, the composition of the ink, and the like. For example, the treatment condition may be set as follows.

Treatment voltage: 10 to 15.6 kV
Treatment speed: 30 to 100 mm/s

From the viewpoint of the effects of the present disclosure, the thickness of the non-permeable substrate is preferably about 5 μm to 1,000 μm, and more preferably 5 μm to 400 μm.

EXAMPLES

Hereinafter, the present invention will be more specifically described based on examples, but the present invention is not limited to the following examples as long as the gist of the present invention is maintained. In addition, unless otherwise specified, "part" is based on mass.

Hereinafter, the present disclosure will be specifically described based on examples, but the present disclosure is not limited thereto. In the present examples, unless otherwise specified, "%" and "part" mean "% by mass" and "part by mass" respectively.

The viscosity and surface tension in the present examples were measured by the methods described above.

<Preparation of First Ink, Second Ink, and Undercoat Composition>

Components were stirred and mixed together at the ratio shown in Tables 1, 2, and 4 by using a mixer (L4R manufactured by Silverson) at room temperature (25° C.) at 5,000 rpm for 20 minutes, thereby preparing the first ink, the second ink, and the undercoat composition used in each of examples and comparative examples.

The unit of the content of each component in Tables 1, 2, and 4 is % by mass. In addition, "-" in Tables 1, 2, and 4 means that the example or comparative example does not contain the component.

Examples 1 to 10 and Comparative Examples 1 and 2

<Ink Jet Recording Method>

As shown in FIG. 1, a single-pass type device was prepared which includes a roller coater that is disposed on the uppermost stream portion of a roll transport system for transporting a substrate 112 and comprises an undercoat coating roller 114 and a feed roller 124 (amount of the undercoat composition coating the substrate: 2 $g/m^2$ (coating film thickness: 2 μm)) and a nip rollers 128, an LED light source 117, an ink jet head 118IR for the first ink, an LED light source 120IR, an ink jet head 118C for the second ink, an LED light source 120C, a nitrogen purge LED exposure machine 122, and a winding roller 126 that are arranged on the downstream of the roll transport system. In addition to the above units, three ink jet heads 118M, 118Y, and 118W and two LED light sources 120M and 120Y are arranged in the device.

As ink jet heads, four CA3 heads for each color manufactured by Toshiba Tec Corporation were arranged in a row. The heads were heated to 45° C., and the frequency was controlled so that 12 pL of droplets were jetted from the heads for recording images. As the LED light sources, an LED light source unit having a peak wavelength of 385 nm (LED Zero Solidcure, manufactured by Integration Technology Ltd.) was used. For nitrogen purge, as an inert gas source, a nitrogen gas generator with a compressor, Maxi-Flow30 (manufactured by Inhouse Gas Ltd.), was connected at a pressure of 0.2 MPa·s, and the nitrogen concentration was set by causing nitrogen to flow at a flow rate of 2 L/min to 10 L/min so that the nitrogen concentration was equal to or higher than 99.9% by volume and the oxygen concentration was equal to or lower than 0.1% by volume in the blanket.

<Image Recording>

By using the above device, an infrared absorbing image was formed on a non-permeable substrate, which is a polyethylene terephthalate (PET) substrate having a thickness of 12 μm, by applying the first ink on the substrate.

Before the application of the second ink, by using the LED light source, the infrared absorbing image was semi-cured by being irradiated with light (at the cumulative light intensity described in Table 1, wavelength of 385 nm). Then, the second ink was applied to the surface of the PET substrate on which the infrared absorbing image was formed, thereby forming a non-infrared absorbing image. The areas to which the second ink was applied in each of the examples and comparative examples are represented by A to C in Table 1. A to C will be described later.

In a case where the unpolymerized rate calculated by the above method was equal to or higher than 0.8, the image was determined as being semi-cured.

Then, the entirety of the infrared absorbing image and the non-infrared absorbing image were irradiated with light (wavelength: 385 nm) from the LED light source so that the cumulative light intensity after the application of the second ink reached the value described in Table 1. In this way, the images were fully cured.

Examples 11 to 16

By using the first ink, the second ink, and the undercoat composition, an infrared absorbing pattern which will be described later was recorded. At this time, the infrared absorbing pattern was recorded in the same manner as in Examples 1 to 10 and Comparative Examples 1 and 2, except that the following undercoat layer forming step and undercoat layer semi-curing step were performed before the application of the first ink, and C in Table 1 was adopted as the area to which the second ink was applied.
[Undercoat Layer Forming Step and Undercoat Layer Semi-Curing Step]

The PET substrate was scanned at a speed of 50 m/min, and an undercoat layer was formed on the PET substrate by using the roller coater described above and semi-cured using the LED light source 117 (at a cumulative light intensity described in Table 2).

Examples 17 to 20 and Comparative Examples 3 to 5

<Ink Jet Recording Method>

Figure 2:
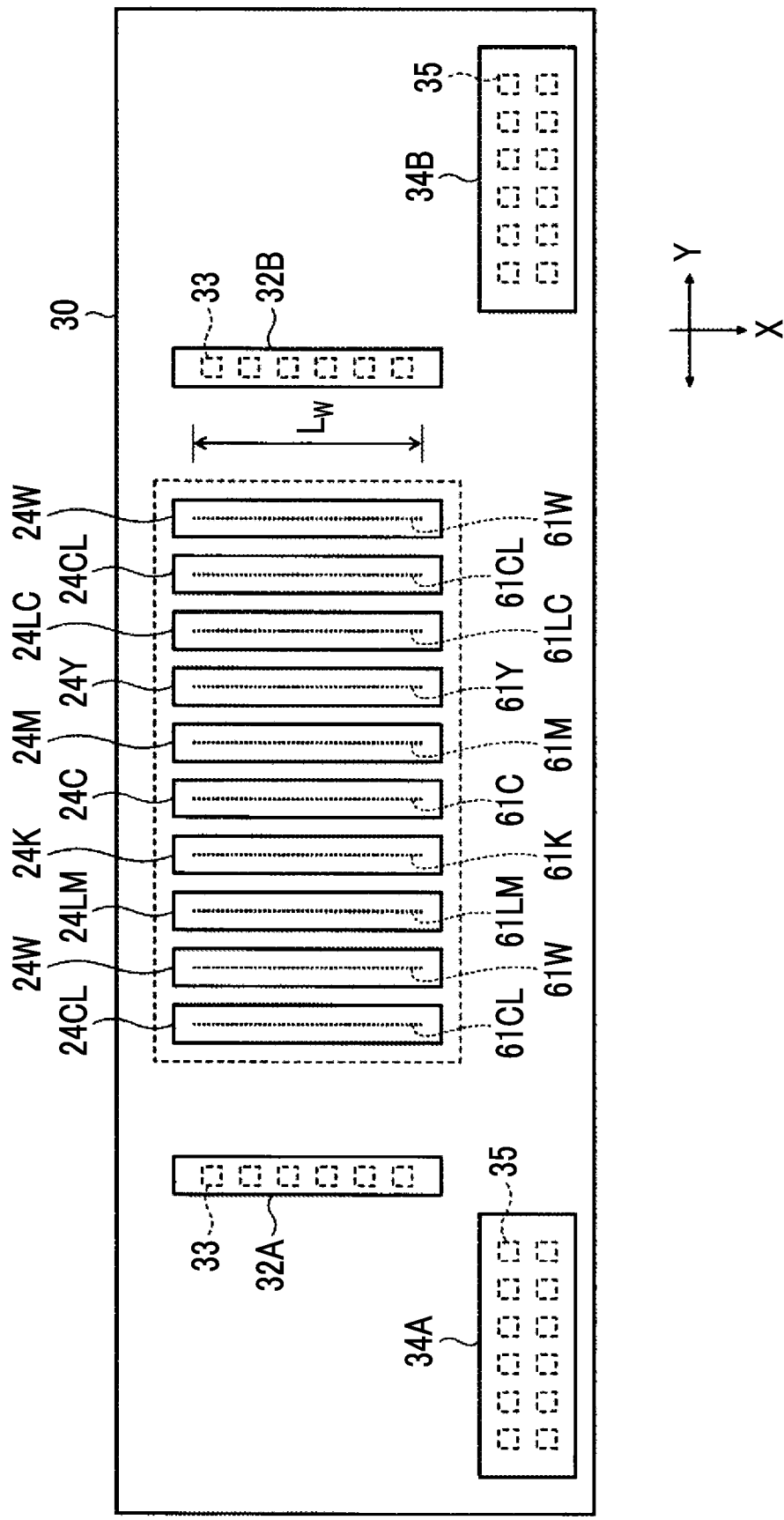
FIG. 2 is a perspective plan view showing the arrangement of ink jet heads, semi-curing light sources, and full curing light sources in an ink jet recording device used in examples.

As shown in FIG. 2, a shuttle scan-type device was used in which ink jet heads for each color (24CL, 24W, 24LM, 24K, 24C, 24M, 24Y, and 24LC) and nozzles for each color (61CL, 61W, 61LM, 61K, 61C, 61M, 61Y, and 61LC) were arranged.

As the heads for each color used for a yellow (Y) ink, a magenta (M) ink, a cyan (C) ink, a black (K) ink, a light cyan (LC) ink, a light magenta (LM) ink, a clear (CL) ink, and a white (W) ink, a piezo-type ink jet head Q-class Sapphire QS-256/10 (manufactured by FUJIFILM Dimatix, Inc., number of nozzles: 256 (100 npi (nozzle per inch)), minimum droplet amount: 10 pL, 30 kHz) was used. In the present example, for recording, an ink supply tank connected to the head for black ink was filled with the first ink, and an ink tank connected to the head for light cyan was filled with the second ink.

As light sources for semi-curing, two light sources 32A and 32B were prepared and used in which light emitting diodes 33 (UV-LED, NC4U134 manufactured by NICHIA CORPORATION, wavelength: 385 nm) were arranged as shown in FIG. 2. These light sources had an illuminance of 780 mW/cm$^2$. As light sources for full curing, light sources 34A and 34B were prepared and used in which twelve light emitting diodes 35 (UV-LED, NC4U134 manufactured by NICHIA CORPORATION, wavelength: 385 nm) were arranged. These light sources had an illuminance of 1,500 mW/cm$^2$.

The ink supply system consisted of an ink pack, supply piping, a degassing filter SEPAREL EF-G2 (manufactured by DIC Corporation), an ink supply tank right in front of an ink jet head, a degassing filter, and a piezo-type ink jet head. In the portion of the degassing filter, pressure was reduced to 0.5 atm.
<Image Recording>

By using the above device, an infrared absorbing image was formed on a non-permeable substrate, which is a VIEWFUL (registered trademark) polyethylene terephthalate (PET) substrate (PET substrate manufactured by KIMOTO), by applying the first ink on the substrate. Before the application of the second ink, by using the LED light source, the infrared absorbing image was semi-cured by being irradiated with light (at the cumulative light intensity described in Table 4, wavelength: 385 nm). Then, the second ink was applied to the surface of the PET substrate on which the infrared absorbing image was formed, thereby forming a non-infrared absorbing image. The areas to which the second ink was applied in each of the examples and comparative examples are represented by A to C in Table 1. A to C will be described later.

Then, the entirety of the infrared absorbing image and the non-infrared absorbing image were irradiated with light (wavelength: 385 nm) from the LED light source so that the cumulative light intensity after the application of the second ink reached the value described in Table 4. In this way, the images were fully cured.

In Comparative Example 5, only the first ink was fully cured by being irradiated with the ultraviolet rays at the cumulative light intensity described in Table 4, then only the second ink was applied again, and the first ink and the second ink were fully cured by being irradiated with ultraviolet rays at the cumulative light intensity described in Table 4.

The recording conditions are as follows.
Scan speed: 1 m/s
Image recording mode: 600 dpi×500 dpi, 12 passes
—Infrared Absorbing Pattern—
[Dot Image]

Supposing that a 5.4 mm×5.4 mm square area is vertically and horizontally divided into 9 parts, a first grid consisting of a total of 81 cells is created. Furthermore, supposing that each cell of the first grid is vertically and horizontally divided into three parts, a second grid consisting of 9 cells is created for each cell of the first grid. In the 5.4 mm×5.4 mm square area, the number of cells of the second grid is 729.

A dot pattern having a diameter of 30 μm to 60 μm is formed in the central portion of any cell of the second grid among the 9 cells of the second grid included in one cell of the first grid. The number of dot patterns in one cell of the first grid is 1 to 9.

Figure 3:
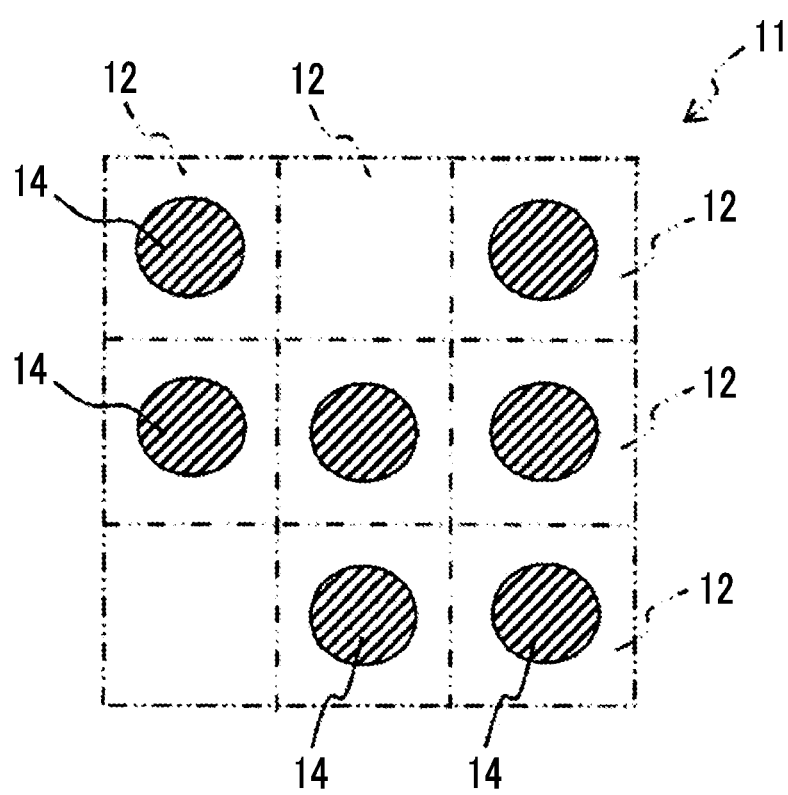
FIG. 3 is a schematic view of a pattern image formed in the present example.

FIG. 3 is a schematic plan view showing an example of the arrangement of dot patterns in the second grid in one cell of the first grid.

As shown in FIG. 3, a dot pattern 14 is formed in the central portion of each of 7 cells of the second grid 12 among the 9 cells of the second grid 12 in the first grid 11. In FIG. 3, some of the cells of the second grid are marked with the reference "12", and only some dot patterns are marked with the reference "14".

In the 5.4 mm×5.4 mm square area, the number of dot patterns (that is, the arrangement of dot patterns) varies among each cell of the first grid.

The infrared absorbing pattern recorded in each of examples and comparative examples is a group of the dot patterns described above. The infrared absorbing pattern was recorded so that each dot was formed of 10 pl of ink.

<Evaluation>

(Evaluation of Visibility)

Ten evaluators were asked to visually observe the recorded infrared absorbing pattern at a distance of 50 cm away, and give scores to the visibility of the infrared absorbing pattern according to the following evaluation score. The scores given by the ten evaluators were averaged and evaluated according to the following evaluation standard. Table 1 shows the results for Examples 1 to 10 and Comparative Examples 1 and 2. Table 2 shows the results for Examples 11 to 16. Table 4 shows the results for Examples 17 to 20 and Comparative Examples 3 to 5. In the following evaluation standard, A to C are within the acceptable range.

—Evaluation Score—
 4: The infrared absorbing pattern is unrecognizable.
 3: The infrared absorbing pattern is unrecognizable unless the pattern is closely watched.
 2: Although the infrared absorbing pattern is recognizable, the pattern is not noticeable.
 1: The infrared absorbing pattern is clearly recognizable.

—Evaluation Standard—
 A: The average of the scores given by the ten evaluators was equal to or higher than 3.5 and equal to or lower than 4.
 B: The average of the scores given by the ten evaluators was equal to or higher than 3.0 and lower than 3.5.
 C: The average of the scores given by the ten evaluators was equal to or higher than 2 and lower than 3.0.
 D: The average of the scores given by the ten evaluators was equal to or higher than 1 and lower than 2.

(Tactility)

In order to check whether or not the infrared absorbing image is recognizable, ten evaluators were asked to touch the recorded infrared absorbing pattern with hand and give scores to the tactility of the infrared absorbing pattern according to the following evaluation score. The scores given by the ten evaluators were averaged and evaluated according to the following evaluation standard. Table 1 shows the results for Examples 1 to 10 and Comparative Examples 1 and 2. Table 2 shows the results for Examples 11 to 16. Table 4 shows the results for Examples 17 to 20 and Comparative Examples 3 to 5. In the following evaluation standard, A to C are within the acceptable range.

—Evaluation Score—
 4: The infrared absorbing pattern is unrecognizable.
 3: The infrared absorbing pattern is unrecognizable unless touching it several times.
 2: Although the infrared absorbing pattern is tactually recognizable, the pattern is not noticeable.
 1: The infrared absorbing pattern is clearly tactually recognizable.

—Evaluation Standard—
 A: The average of the scores given by the ten evaluators was equal to or higher than 3.5 and equal to or lower than 4.
 B: The average of the scores given by the ten evaluators was equal to or higher than 3.0 and lower than 3.5.
 C: The average of the scores given by the ten evaluators was equal to or higher than 2 and lower than 3.0.
 D: The average of the scores given by the ten evaluators was equal to or higher than 1 and lower than 2.

(Adhesiveness Evaluation)

CELLOTAPE (registered trademark, manufactured by NICHIBAN Co., Ltd., 2.4 mm) was firmly stuck to the recording portion formed as above on the recording surface of the obtained record. Then, one end of the tape was gripped, and the tape was peeled off along the surface of the PET substrate, thereby determining whether the adhesiveness is excellent or poor.

Table 1 shows the results for Examples 1 to 10 and Comparative Examples 1 and 2. Table 2 shows the results for Examples 11 to 16. Table 4 shows the results for Examples 17 to 20 and Comparative Examples 3 to 5.

In the following evaluation score, A to C represent the adhesiveness obtained in a case where a sample is evaluated under harsh conditions that are unlikely to be created in practice. Therefore, in reality, all the examples including the example obtaining the following evaluation score C exhibited adhesiveness unproblematic for practical use.

—Evaluation Score—
 A: The image is not peeled off.
 B: The image is partially damaged.
 C: The entire image is peeled off.

TABLE 1

| | | | 1 | 2 | 3 | 4 | 5 | 6 | 7 | 8 | 9 | 10 | Comparative example 1 | Comparative example 2 |
|---|---|---|---|---|---|---|---|---|---|---|---|---|---|---|
| | | | | | | Example | | | | | | | | |
| First ink | First curable compound | Radically polymerizable monomer | SR341 | 79.7 | 79.7 | 79.7 | 79.7 | 79.7 | 79.7 | 79.7 | 79.7 | 72.7 | 79.7 | 79.7 | 79.7 |
| | | | SR344 | 10 | 10 | 10 | 10 | 10 | 10 | 10 | 10 | 10 | 10 | 10 | 10 |
| | | Refractive index | | 1.454 | 1.454 | 1.454 | 1.454 | 1.454 | 1.454 | 1.454 | 1.454 | 1.455 | 1.454 | 1.454 | 1.454 |
| | Radical polymerization initiator | | IRGACURE 819 | 4 | 4 | 4 | 4 | 4 | 4 | 4 | 4 | 4 | 4 | 4 | 4 |
| | | | Speedcure 7010L | 2 | 2 | 2 | 2 | 2 | 2 | 2 | 2 | 2 | 2 | 2 | 2 |
| | Infrared absorbing coloring material | | IR-1 | 3 | 3 | 3 | 3 | 3 | 3 | 3 | 3 | 3 | 3 | 3 | 3 |
| | | | cesium tungsten oxide | — | — | — | — | — | — | — | — | — | — | — | — |
| | Polymerization inhibitor | | UV-22 | 0.3 | 0.3 | 0.3 | 0.3 | 0.3 | 0.3 | 0.3 | 0.3 | 0.3 | 0.3 | 0.3 | 0.3 |
| | Surfactant | | BYK-307 | 1 | 1 | 1 | 1 | 1 | 1 | 1 | 1 | 1 | 1 | 1 | 1 |
| | Organic solvent | | Propylene glycol methyl ethyl acetate | — | — | — | — | — | — | — | — | — | — | — | — |
| | Total (% by mass) | | | 100 | 100 | 100 | 100 | 100 | 100 | 100 | 100 | 100 | 100 | 100 | 100 |
| | Surface tension | | mN/m | 25 | 25 | 25 | 25 | 25 | 25 | 25 | 25 | 25 | 25 | 25 | 25 |
| Curing mode before application of second ink | | | | Semi-curing | Semi-curing | Semi-curing | Semi-curing | Semi-curing | Semi-curing | Semi-curing | Semi-curing | Semi-curing | Semi-curing | Full curing | Full curing |
| | | | | 82.7 | 82.7 | 82.7 | 72.7 | 72.7 | 62.7 | 32.7 | 83.4 | 82.7 | 82.7 | | 82.7 |
| | | | | | | | | | 20 | 60 | | | | | |
| Second ink | Second curable compound | Radically polymerizable monomer | SR341 | 10 | 10 | 10 | 10 | 10 | 10 | — | 10 | 10 | 10 | — | 10 |
| | | | DVE-3 | — | — | — | — | — | — | — | — | — | — | — | — |
| | | | SR344 | | | | | | | | | | | | |
| | | Refractive index | | 1.454 | 1.454 | 1.454 | 1.455 | 1.455 | 1.454 | 1.453 | 1.454 | 1.454 | 1.454 | | 1.454 |
| | Radical polymerization initiator | | IRGACURE 819 | 4 | 4 | 4 | 4 | 4 | 4 | 4 | 4 | 4 | 4 | | 4 |
| | | | Speedcure 7010L | 2 | 2 | 2 | 2 | 2 | 2 | 2 | 2 | 2 | 2 | | 2 |
| | Coloring material | | Yellow mill base A | — | — | — | — | — | — | — | — | — | — | | — |
| | | | Magenta mill base B | — | — | — | 10 | 10 | — | — | — | — | — | | — |
| | Polymerization inhibitor | | UV-22 | 0.3 | 0.3 | 0.3 | 0.3 | 0.3 | 0.3 | 0.3 | 0.3 | 0.3 | 0.3 | | 0.3 |
| | Surfactant | | BYK-307 | 1 | 1 | 1 | 1 | 1 | 1 | 1 | 0.3 | 1 | 1 | | 1 |
| | Total (% by mass) | | | 100 | 100 | 100 | 100 | 100 | 100 | 100 | 100 | 100 | 100 | | 100 |
| | Surface tension | | mN/m | 24 | 24 | 24 | 25 | 25 | 25 | 25 | 30 | 24 | 24 | | 24 |
| Absolute value of difference in refractive index | | | | 0.000 | 0.000 | 0.000 | 0.001 | 0.001 | 0.000 | 0.001 | 0.000 | 0.001 | 0.000 | | 0.000 |
| Presence or absence of the same curable compound taking up 50% by mass or more of total mass of each ink | | | | Present | Present | Present | Present | Present | Present | Absent | Present | Present | Present | | Present |
| Evaluation | Second ink recording area | | | A | B | C | C | C | C | C | C | C | C | A | A |
| | Visibility | | | B | B | A | A | A | B | B | B | B | A | D | C |
| | Tactility | | | B | A | A | A | A | A | B | A | A | A | D | C |
| | adhesiveness | | | C | C | C | C | C | C | C | C | C | C | C | C |

TABLE 2

|  |  |  | Example 11 | Example 12 | Example 13 | Example 14 | Example 15 | Example 16 |
|---|---|---|---|---|---|---|---|---|
| Undercoat composition | Isocyanate compound | TAKENATE D170N | 70 | 45 | 18 | — | — | — |
|  |  | TAKENATE D160N | — | — | — | 18 | — | — |
|  |  | TAKENATE D178NL | — | — | — | — | 18 | — |
|  |  | TAKENATE D110N | — | — | — | — | — | 18 |
|  | Radically polymerizable monomer | SR341 | 25 | 40 | 40 | 40 | 40 | 40 |
|  |  | SR344 | — | 10 | 10 | 10 | 10 | 10 |
|  |  | Etermer265 | — | — | 12 | 12 | 12 | 12 |
|  | Urethane oligomer | UV7600B | — | — | 15 | — | — | — |
|  |  | UV7630B | — | — | — | 15 | — | — |
|  |  | UV7640B | — | — | — | — | 15 | — |
|  |  | UV7650B | — | — | — | — | — | 15 |
|  | Radical polymerization initiator | IRGACURE 819 | 4 | 4 | 4 | 4 | 4 | 4 |
|  | Surfactant | BYK-307 | 1 | 1 | 1 | 1 | 1 | 1 |
|  | Total (% by mass) |  | 100 | 100 | 100 | 100 | 100 | 100 |
|  | Curing mode before application of second ink |  | Semi-curing | Semi-curing | Semi-curing | Semi-curing | Semi-curing | Semi-curing |
| First ink | First curable compound | Radically polymerizable monomer | SR341 | 79.7 | 79.7 | 77.7 | 77.7 | 77.7 | 77.7 |
|  |  | SR344 | 10 | 10 | 10 | 10 | 10 | 10 |
|  | Refractive index |  | 1.454 | 1.454 | 1.454 | 1.454 | 1.454 | 1.454 |
|  | Radical polymerization initiator | IRGACURE 819 | 4 | 4 | 4 | 4 | 4 | 4 |
|  |  | Speedcure 7010L | 2 | 2 | 2 | 2 | 2 | 2 |
|  | Infrared absorbing coloring material | IR-15 | 3 | 3 | — | — | — | — |
|  |  | cesium tungsten oxide | — | — | 5 | 5 | 5 | 5 |
|  | Polymerization inhibitor | UV-22 | 0.3 | 0.3 | 0.3 | 0.3 | 0.3 | 0.3 |
|  | Surfactant | BYK-307 | 1 | 1 | 1 | 1 | 1 | 1 |
|  | Total (% by mass) |  | 100 | 100 | 100 | 100 | 100 | 100 |
|  | Surface tension | mN/m | 25 | 25 | 25 | 25 | 25 | 25 |
|  | Cumulative light intensity before application of second ink (mJ/cm$^2$) |  | 10 | 10 | 10 | 10 | 10 | 10 |
|  | Curing Mode |  | Semi-curing | Semi-curing | Semi-curing | Semi-curing | Semi-curing | Semi-curing |
| Second ink | Second curable compound | Radically polymerizable monomer | SR341 | 82.7 | 82.7 | 82.7 | 82.7 | 82.7 | 82.7 |
|  |  | SR344 | 10 | 10 | 10 | 10 | 10 | 10 |
|  | Refractive index |  | 1.454 | 1.454 | 1.454 | 1.454 | 1.454 | 1.454 |
|  | Radical polymerization initiator | IRGACURE 819 | 4 | 4 | 4 | 4 | 4 | 4 |
|  |  | Speedcure 7010L | 2 | 2 | 2 | 2 | 2 | 2 |
|  | Polymerization inhibitor | UV-22 | 0.3 | 0.3 | 0.3 | 0.3 | 0.3 | 0.3 |
|  | Surfactant | BYK-307 | 1 | 1 | 1 | 1 | 1 | 1 |
|  | Total (% by mass) |  | 100 | 100 | 100 | 100 | 100 | 100 |
|  | Surface tension | mN/m | 24 | 24 | 24 | 24 | 24 | 24 |
| Absolute value of difference in refractive index |  |  | 0.000 | 0.000 | 0.000 | 0.000 | 0.000 | 0.000 |
| Presence or absence of the same curable compound taking up 50% by mass or more of total mass of each ink |  |  | Present | Present | Present | Present | Present | Present |
| Evaluation | Second ink recording area |  | C | C | C | C | C | C |
|  | Visibility |  | A | A | A | A | A | A |
|  | Tactility |  | A | A | A | A | A | A |
|  | adhesiveness |  | A | A | A | A | A | A |

"Second ink recording portion" in Tables 1 and 2 means the following.

A: area other than area of infrared absorbing image

B: area including part of area of infrared absorbing image and area other than area of infrared absorbing image C: whole surface including entire area of infrared absorbing image The materials shown in Tables 1 and 2 are as below. The unit of the content of each component in Tables 1 and 2 is part by mass. In addition, "-" in Tables 1 and 2 means that the example or comparative example does not contain the corresponding component.

<Infrared Absorber>

IR-1: compound represented by the following structural formula

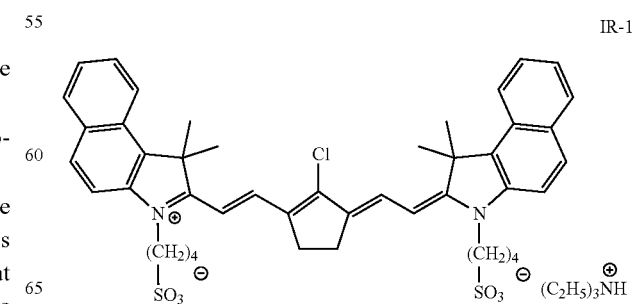

IR-1

IR-15: compound represented by the following structural formula $$\text{IR-15}$$

[Structural formula of IR-15: a squaraine-type dye with two indoline units bearing gem-dimethyl groups, each N-substituted with a propyl-SO$_3$K group, connected through a central cyclobutenedione (oxocyclobutenolate) core]

Cesium tungsten oxide (manufactured by SUMITOMO METAL MINING CO., LTD.)

<Radically Polymerizable Monomer>
SR341: 3-methyl-1,5-pentanediol diacrylate (number of functional groups: 2, manufactured by Sartomer Japan, Inc.)
DVE-3: triethylene glycol divinyl ether (number of functional groups: 2, manufactured by BASF SE)
SR344: polyethylene glycol (400) diacrylate (number of functional groups: 2, manufactured by Sartomer Japan, Inc.)
Etermer265: dipentaerythritol polyacrylate (number of functional groups: 6, manufactured by Eternal Materials Co., Ltd.)

<Radical Polymerization Initiator>
IRGACURE 819 (bis(2,4,6-trimethylbenzoyl)phenylphosphine oxide, manufactured by BASF SE, molecular weight: 419)
Speedcure 7010L (manufactured by Lambson, molecular weight: 1,899)

<Isocyanate Compound>
TAKENATE D160N (adduct of hexamethylene diisocyanate and trimethylolpropane, manufactured by Mitsui Chemicals & SKC Polyurethanes Inc.)
TAKENATE D170N (isocyanurate of hexamethylene diisocyanate, manufactured by Mitsui Chemicals & SKC Polyurethanes Inc.)
TAKENATE D178NL (allophanate of hexamethylene diisocyanate, manufactured by Mitsui Chemicals & SKC Polyurethanes Inc.)
TAKENATE D110N (adduct of xylylene diisocyanate and trimethylolpropane, manufactured by Mitsui Chemicals & SKC Polyurethanes Inc.)

<Urethane Oligomer>
UV7600B, UV7630B, UV7640B, and UV7650B (urethane acrylate-based oligomers, manufactured by The Nippon Synthetic Chemical Industry Co., Ltd.)

<Polymerization Inhibitor>
UV-22 (Irgastab (registered trademark) UV-22, mixture of 2,6-bis(1,1-dimethylethyl)-4-(phenylmethylene)-2,5-cyclohexazin-1-one and glycerol triacrylate (mass ratio: 20:80), manufactured by BASF SE)

<Surfactant>
BYK-307 (silicone-based surfactant (polyether-modified polydimethylsiloxane), manufactured by BYK-Chemie GmbH)

<Organic Solvent>
Propylene glycol methyl ether acetate (manufactured by Tokyo Chemical Industry Co., Ltd.)

<Preparation of Yellow Mill Base A>
NOVOPERM YELLOW H2G (300 parts by mass), 620 parts by mass of SR9003, and 80 parts by mass of SOLSPERSE 32000 were stirred and mixed together, thereby obtaining a yellow mill base A. The yellow mill base A was prepared by being put in a disperser motor mill M50 (manufactured by Eiger) and dispersed at a circumferential speed of 9 m/s for 4 hours by using zirconia beads having a diameter of 0.65 mm.

<Preparation of Magenta Mill Base B>
By the same method as that used for preparing the yellow mill base A, a magenta mill base B composed as shown in Table 3 was prepared under the dispersion conditions shown in Table 3.

TABLE 3

| Mill base | | Yellow mill base A | Magenta mill base B |
|---|---|---|---|
| Composition (part) | NOVOPERM YELLOW H2G | 300 | — |
| | CINQUASIA MAGENTA RT-355-D | — | 300 |
| | SR9003 | 620 | 600 |
| | SOLSPERSE 32000 | 80 | 100 |
| Dispersion condition | Circumference speed (m/s) | 9 | 9 |
| | Time (hour) | 4 | 10 |

Details of the components listed in Table 3 are as follows. The unit of the content of each component in Table 3 is part by mass. In addition, "-" in Table 3 means that the example or comparative example does not contain the corresponding component.

<Colorant>
CINQUASIA MAGENTA RT-355-D (magenta pigment, manufactured by BASF Japan Ltd.)
NOVOPERM YELLOW H2G (yellow pigment, manufactured by Clariant)

<Dispersant>
SOLSPERSE 32000 (dispersant manufactured by Noveon)

<Radically Polymerizable Monomer>
SR9003: propoxylated (2) neopentyl glycol diacrylate (manufactured by Sartomer Japan, Inc.)

TABLE 4

| | | | | Example | | | | Comparative example | | |
|---|---|---|---|---|---|---|---|---|---|---|
| | | | | 17 | 18 | 19 | 20 | 3 | 4 | 5 |
| First ink | First curable compound | Radically polymerizable monomer | NVC | — | — | 23.4 | — | — | 28.4 | — |
| | | | EOTMPTA | — | — | 3.5 | — | — | 3.5 | — |
| | | | CTFA | — | — | 54.8 | — | — | — | — |
| | | | PEA | — | — | — | — | — | 54.8 | — |

TABLE 4-continued

|  |  |  | | Example | | | | Comparative example | | |
|---|---|---|---|---|---|---|---|---|---|---|
|  |  |  |  | 17 | 18 | 19 | 20 | 3 | 4 | 5 |
|  |  |  | IBOA | 46.1 | 41.1 | — | 41.1 | 46.1 | — | 46.1 |
|  |  |  | EOEOEA | 20 | 20 | — | 20 | 20 | — | 20 |
|  |  |  | 2-MTA | 20.6 | 20.6 | — | 20.6 | 20.6 | — | 20.6 |
|  |  | Radically polymerizable oligomer | CN964A85 | — | 5 | 5 | 5 | — | — | — |
|  |  | Refractive index |  | 1.456 | 1.457 | 1.471 | 1.457 | 1.456 | 1.506 | 1.439 |
|  | Radical polymerization initiator | | IRGACURE 819 | 3 | 3 | 3 | 3 | 3 | 3 | 3 |
|  | | | DAROCUR TPO | 2.8 | 2.8 | 2.8 | 2.8 | 2.8 | 2.8 | 2.8 |
|  | | | ITX | 3 | 3 | 3 | 3 | 3 | 3 | 3 |
|  | Infrared absorbing coloring material | | IR-24 | 3 | 3 | 3 | 3 | 3 | 3 | 3 |
|  | Polymerization inhibitor | | MEHQ | 0.5 | 0.5 | 0.5 | 0.5 | 0.5 | 0.5 | 0.5 |
|  |  |  | ST-1 | 1 | 1 | 1 | 1 | 1 | 1 | 1 |
|  | Total (% by mass) | | | 100 | 100 | 100 | 100 | 100 | 100 | 100 |
|  | Surface tension | | mN/m | 38 | 38 | 38 | 38 | 38 | 38 | 38 |
|  | Cumulative light intensity before application of second ink (mJ/cm$^2$) | | | 30 | 30 | 30 | 30 | 400 | 30 | 400 |
|  | Curing mode before application of second ink | | | Semi-curing | Semi-curing | Semi-curing | Semi-curing | Full curing | Semi-curing | Full curing |
| Second ink | Second curable compound | Radically polymerizable monomer | NVC | — | — | 26.4 | — | — | — | — |
|  |  |  | EOTMPTA | — | — | 3.5 | — | — | — | — |
|  |  |  | CTFA | — | — | 54.8 | — | — | — | — |
|  |  |  | IBOA | 49.1 | 44.1 | — | 49.1 | — | — | 49.1 |
|  |  |  | EOEOEA | 20 | 20 | — | 20 | — | 20 | 20 |
|  |  |  | 2-MTA | 20.6 | 20.6 | — | 20.6 | — | 80 | 20.6 |
|  |  | Radically polymerizable oligomer | CN964A85 | — | 5 | 5 | — | — | — | — |
|  |  | Refractive index |  | 1.457 | 1.456 | 1.471 | 1.457 | — | 1.429 | 1.457 |
|  | Radical polymerization initiator | | IRGACURE 819 | 3 | 3 | 3 | 3 | — | — | 3 |
|  | | | DAROCUR TPO | 2.8 | 2.8 | 2.8 | 2.8 | — | — | 2.8 |
|  | | | ITX | 3 | 3 | 3 | 3 | — | — | 3 |
|  | Polymerization inhibitor | | MEHQ | 0.5 | 0.5 | 0.5 | 0.5 | — | — | 0.5 |
|  |  |  | ST-1 | 1 | 1 | 1 | 1 | — | — | 1 |
|  | Total (% by mass) | | | 100 | 100 | 100 | 100 | 0 | 100 | 100 |
|  | Surface tension | | mN/m | 38 | 38 | 38 | 38 | — | — | 38 |
|  | Cumulative light intensity before application of second ink (mJ/cm$^2$) | | | 400 | 400 | 400 | 400 | — | 400 | 400 |
| Absolute value of difference in refractive index | | | | 0.001 | 0.001 | 0.000 | 0.000 | — | 0.077 | 0.018 |
| Presence or absence of the same curable compound taking up 50% by mass or more of total mass of each ink | | | | Present | Present | Present | Present | — | Absent | Present |
| Evaluation | Second ink recording area | | | C | C | C | C | C | A | C |
|  | Visibility | | | A | A | A | A | D | C | C |
|  | Tactility | | | A | A | A | A | C | A | B |
|  | adhesiveness | | | B | A | A | B | C | C | B |

"Second ink recording portion" in Table 4 means the following.
A: area other than area of infrared absorbing image
B: area including part of area of infrared absorbing image and area other than area of infrared absorbing image
C: whole surface including entire area of infrared absorbing image The unit of the content of each component in Table 4 is part by mass. In addition, "-" in Table 4 means that the example or comparative example does not contain the corresponding component.

The components listed in Table 4 are as follows.
NVC: N-vinylcaprolactam (number of functional groups: 1, V-CAP, manufactured by ISP)
CTFA: cyclic trimethylolpropane formal acrylate (number of functional groups: 1, SR531, manufactured by Sartomer Japan, Inc.)
EOTMPTA: ethoxylated (3) trimethylolpropane triacrylate (a compound obtained by triacrylating a 3-mol adduct of trimethylolpropane ethylene oxide) (number of functional groups: 3, SR454DNS, manufactured by Sartomer Japan, Inc.)
PEA: 2-phenoxyethyl acrylate (number of functional groups: 1, manufactured by Tokyo Chemical Industry Co., Ltd.) •IBOA (number of functional groups: 1, isobornyl acrylate, manufactured by OSAKA ORGANIC CHEMICAL INDUSTRY LTD.)
EOEOEA (number of functional groups: 1, ethoxyethoxyethyl acrylate, SR256, manufactured by Sartomer Japan, Inc.)
2-MTA (number of functional groups: 1,2-methoxyethyl acrylate, manufactured by OSAKA ORGANIC CHEMICAL INDUSTRY LTD.)
IRGACURE 819: bis(2,4,6-trimethylbenzoyl)phenylphosphine oxide (manufactured by Ciba-Geigy Japan Ltd.)
DAROCUR TPO: 2,4,6-trimethylbenzoyldiphenylphosphine oxide (manufactured by Ciba-Geigy Japan Ltd.)
ITX (isopropylthioxanthone, manufactured by LAMBSON)
ST-1 (FIRSTCURE ST-1, polymerization inhibitor, manufactured by Chem First)
MEHQ (methoxyhydroquinone, manufactured by FUJIFILM Wako Pure Chemical Corporation)

CN964A85: CN964A85 (urethane acrylate-based oligomer, number of functional groups: 2, manufactured by Sartomer Japan, Inc.)

IR-24: compound represented by the following structural formula

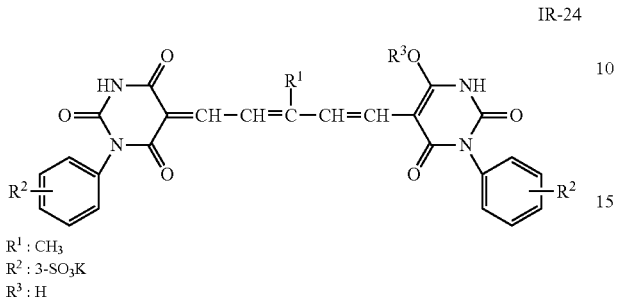

IR-24

$R^1$ : $CH_3$
$R^2$ : 3-$SO_3$K
$R^3$ : H

As shown in Tables 1, 2, and 4, in Examples 1 to 20, visibility and tactility could be excellently suppressed.

Particularly, in Example 3 in which the content of the organic solvent in the first ink was equal to or lower than 1% by mass with respect to the total mass of the first ink, the tactility could be further suppressed than in Example 10 in which the content of the organic solvent in the first ink was higher than 1% by mass with respect to the total mass of the first ink.

In Examples 11 to 16 in which the undercoat composition was used, higher adhesiveness was obtained.

In Example 18 in which the first ink and the second ink contained an oligomer, the adhesiveness was higher than in Example 17 in which the first ink and the second ink did not contain an oligomer.

The entire disclosure of Japanese Patent Application No. 2018-185540, filed Sep. 28, 2018, is incorporated into the present specification by reference.

All the documents, patent applications, and technical standards described in the present specification are incorporated into the present specification by reference as if each of the documents, each of the patent applications, and each of the technical standards are specifically and individually described and incorporated by reference.

What is claimed is:

1. An ink jet recording method comprising:
   recording an infrared absorbing image by applying a first ink, which contains an infrared absorber and a first curable compound to be cured by application of active energy rays, onto an impermeable substrate by an ink jet method;
   semi-curing the infrared absorbing image by irradiating the infrared absorbing image with active energy rays;
   recording a non-infrared absorbing image by applying a second ink, which has a content of the infrared absorber of lower than 0.1% by mass and contains a second curable compound, to a surface of the substrate with the semi-cured infrared absorbing image by the ink jet method; and
   curing the semi-cured infrared absorbing image and the non-infrared absorbing image by irradiating these images with active energy rays,
   wherein the first curable compound and the second curable compound contain a urethane (meth)acrylate-based oligomer,
   wherein an absolute value of a difference between a refractive index of the first curable compound and a refractive index of the second curable compound is equal to or lower than 0.07, and
   wherein, in a case where the infrared absorber is prepared as a solution having a concentration of 0.01% by mass, an absorbance of the solution at a wavelength of 400 nm to 650 nm is equal to or lower than 0.1.

2. The ink jet recording method according to claim 1, wherein the recording of a non-infrared absorbing image is applying the second ink to an area of the substrate that includes at least a part of an area in which the infrared absorbing image is recorded and an area other than the area in which the infrared absorbing image is recorded.

3. The ink jet recording method according to claim 1, wherein the recording of a non-infrared absorbing image is applying the second ink to an area of the substrate that includes the entirety of an area in which the infrared absorbing image is recorded.

4. The ink jet recording method according to claim 1, wherein a content of an organic solvent in the first ink is lower than 1% by mass with respect to a total mass of the first ink.

5. The ink jet recording method according to claim 1, further comprising performing, before the recording of an infrared absorbing image:
   forming an undercoat layer by applying an undercoat composition, which contains an isocyanate group-containing compound, a radically polymerizable monomer, and a radical polymerization initiator, onto the impermeable substrate,
   wherein the curing is irradiating the infrared absorbing image, the non-infrared absorbing image, and the undercoat layer with active energy rays.

6. The ink jet recording method according to claim 5, further comprising performing, between the forming of an undercoat layer and the recording of an infrared absorbing image:
   semi-curing the undercoat composition, which is applied in the forming of an undercoat layer, by irradiating the undercoat composition with active energy rays.

7. The ink jet recording method according to claim 1, wherein a compound taking up 50% by mass or more of a total mass of the first curable compound and a compound taking up 50% by mass or more of a total mass of the second curable compound are the same compound.

8. The ink jet recording method according to claim 1, wherein a compound taking up 70% by mass or more of a total mass of the first curable compound and a compound taking up 70% by mass or more of a total mass of the second curable compound are the same compound.

9. The ink jet recording method according claim 1, wherein an absolute value of a difference between surface tension of the first ink and surface tension of the second ink is 0 mN/m to 3 mN/m.

* * * * *